US010020120B2

(12) United States Patent
Doi

(10) Patent No.: US 10,020,120 B2
(45) Date of Patent: Jul. 10, 2018

(54) ELECTRONIC DEVICE AND MANUFACTURING METHOD FOR SAME

(71) Applicant: Katsuhiro Doi, Chiba (JP)

(72) Inventor: Katsuhiro Doi, Chiba (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 352 days.

(21) Appl. No.: 13/632,580

(22) Filed: Oct. 1, 2012

(65) Prior Publication Data

US 2013/0026463 A1 Jan. 31, 2013

Related U.S. Application Data

(63) Continuation of application No. PCT/JP2011/058230, filed on Mar. 31, 2011.

(30) Foreign Application Priority Data

Apr. 2, 2010 (JP) ................................ 2010-086593
Apr. 2, 2010 (JP) ................................ 2010-086594

(51) Int. Cl.
*H01L 29/10* (2006.01)
*H01L 29/12* (2006.01)
(Continued)

(52) U.S. Cl.
CPC ......... *H01G 9/2077* (2013.01); *G02F 1/1339* (2013.01); *H01G 9/2031* (2013.01);
(Continued)

(58) Field of Classification Search
CPC ... H01G 9/2031; H01G 9/2059; Y02E 10/542
(Continued)

(56) References Cited

U.S. PATENT DOCUMENTS

2005/0229966 A1* 10/2005 Komiya et al. ............... 136/263
2007/0120177 A1* 5/2007 McGregor ............. G02F 1/153
257/321

(Continued)

FOREIGN PATENT DOCUMENTS

AU 2008299574 A1 3/2009
CN 101855687 A 10/2010

(Continued)

OTHER PUBLICATIONS

Chinese Office Action dated Jan. 9, 2015 in Chinese Patent Application No. 201180013035.3.

*Primary Examiner* — Joseph C Nicely
*Assistant Examiner* — Wilner Jean Baptiste
(74) *Attorney, Agent, or Firm* — Sughrue Mion, PLLC

(57) ABSTRACT

The present invention is an electronic device comprising a first substrate, a second substrate arranged opposite the first substrate, a sealed portion arranged between the first substrate and the second substrate, and a sealing portion that connects the first and the second substrate and is provided around the sealed portion, wherein at least a portion of the sealing portion following along the periphery of the sealed portion has outer resin sealing portions respectively fixed to the first substrate and the second substrate and an intermediate resin sealing portion arranged so as to be interposed by the outer resin sealing portions between the first substrate and the second substrate, the outer resin sealing portions and the intermediate resin sealing portion contain resin, and a melt flow rate or melting point of the intermediate resin sealing portion differs from a melt flow rate or melting point of the outer resin sealing portions.

3 Claims, 13 Drawing Sheets

100
2
9 10
3
4a
4b
4
4a
6 7 8
1

(51) Int. Cl.
*H01G 9/20* (2006.01)
*H01M 2/08* (2006.01)
*H01M 10/04* (2006.01)
*G02F 1/1339* (2006.01)

(52) U.S. Cl.
CPC ............. *H01G 9/2059* (2013.01); *H01M 2/08* (2013.01); *H01M 10/0463* (2013.01); *Y02E 10/542* (2013.01)

(58) Field of Classification Search
USPC .................................................... 257/43, 792
See application file for complete search history.

(56) References Cited

U.S. PATENT DOCUMENTS

| | | | | |
|---|---|---|---|---|
| 2007/0125420 | A1* | 6/2007 | Ezure | H01G 9/2031 136/263 |
| 2007/0284761 | A1* | 12/2007 | Morooka et al. | 257/792 |
| 2008/0053512 | A1* | 3/2008 | Kawashima | B32B 17/10018 136/244 |
| 2009/0250100 | A1* | 10/2009 | Hayes | B32B 17/10018 136/251 |
| 2009/0272433 | A1* | 11/2009 | Morooka | H01G 9/2031 136/256 |
| 2010/0126557 | A1* | 5/2010 | Chou | B32B 17/10743 136/251 |
| 2010/0200064 | A1* | 8/2010 | Hung | H01G 9/2077 136/259 |
| 2010/0206461 | A1 | 8/2010 | Murray et al. | |

FOREIGN PATENT DOCUMENTS

| | | | |
|---|---|---|---|
| EP | 2 043 191 | | 4/2009 |
| JP | 2004-094117 | | 3/2004 |
| JP | 2004-214063 | A | 7/2004 |
| JP | 2005-050927 | A | 2/2005 |
| JP | 2005-158709 | A | 6/2005 |
| JP | 2007-194075 | A | 8/2007 |
| JP | 2007-220606 | A | 8/2007 |
| JP | 2009-245782 | A | 10/2009 |
| JP | 2010-198836 | A | 9/2010 |
| KR | 10-2010-0056552 | A | 5/2010 |
| WO | 2009/033214 | A1 | 3/2009 |
| WO | 2010/050207 | A1 | 5/2010 |
| WO | 2010/098311 | A1 | 9/2010 |

* cited by examiner 100
2
10
9
3
4
4a
4b
4a
8
7
6
1

4A
C1
4b
4a
8
7
6
1
4a
4b
4A
C1

C2
4a
4B
2
10
9
4B
4a
C2

4A
C1
4b
4a
8
7
1
6
3
4a
4b
4A
C1

2
10
9
C2
4a
4B
4A
C1
4b
3
8
7
6
1

101
4A
13A (C1)
8
7
6
4A
13A (C1)

102
10
9
(C2)
13B
4B
(C2)
13B
4B 200
201
201
2
10
9
3
8
7
6
1
4
4a
4b
4a
4
4a
4b
4a
202
204
204
203

ELECTRONIC DEVICE AND MANUFACTURING METHOD FOR SAME

CROSS REFERENCE TO RELATED APPLICATIONS

This application is a Continuation of National Stage of International Application No. PCT/JP2011/58230 filed Mar. 31, 2011, claiming priority based on Japanese Patent Applications No. 2010-086593 filed Apr. 2, 2010 and No. 2010-086594 filed Apr. 2, 2010, the contents of all of which are incorporated herein by reference in their entirety.

TECHNICAL FIELD

The present invention relates to an electronic device and a manufacturing method therefor.

BACKGROUND ART

Known examples of electronic devices include photoelectric conversion elements such as dye-sensitized solar cells or organic thin-film solar cells and display elements such as liquid crystal display devices or EL display devices.

A functional device that has favorable sealing performance and is resistant to the occurrence of short circuits by arranging an insulating spacer between a pair of substrates and joining the insulating spacer to the pair of substrates with a sealing material has been proposed as an example of such an electronic device (see, for example, Patent Document 1). This Patent Document 1 discloses the use of an inorganic material such as glass, alumina or quartz or organic material such as polyethylene for the insulating spacer, and the use of an acrylic resin or glass frit and the like for the sealing material (Examples).

PRIOR ART DOCUMENTS

Patent Documents

Patent Document 1: Japanese Patent Application Laid-open No. 2007-194075

SUMMARY OF THE INVENTION

Problems to be Solved by the Invention

However, the functional device described in the above-mentioned Patent Document 1 has the problems indicated below.

Namely, the functional device described in Patent Document 1 can be placed in an environment subject to large changes in temperature, such as outdoors where the temperature varies greatly between day and night. In the case of a functional device such as a solar cell in particular, there is a high possibility of the device being placed in an environment subjected to large changes in temperature such as outdoors. At this time, the pair of substrates, the sealing material and the spacer undergo repeated thermal expansion and thermal contraction. Here, if the spacer is composed with an inorganic material such as glass, since the linear coefficients of expansion normally differ between the sealing material and the substrates, excessive stress acts on the interface between the sealing material and the spacer or on the interface between the sealing material and the substrates. In addition, even in the case the spacer is composed with a resin, excessive stress may act on the interface between the sealing material and the spacer or on the interface between the sealing material and the substrates. Consequently, as a result of a decrease in sealability and adhesion between the sealing material and the spacer, sealing performance of the functional device decreases thereby preventing durability from being maintained.

Therefore, an object of the present invention is to provide an electronic device capable of adequately maintaining durability even in the case of being placed in an environment subjected to large changes in temperature, and a manufacturing method therefor.

Means for Solving the Problems

As a result of conducting extensive studies to solve the above-mentioned problems, the inventor of the present invention considered that it may be possible to adequately maintain the durability of an electronic device even in the case of being placed in an environment subjected to large changes in temperature by differing the hardness of an insulating spacer and sealing material arranged between a pair of substrates. Namely, the inventor of the present invention considered that it may be possible to inhibit concentration of stress generated in an electronic device accompanying temperature changes at the interface between a sealing material and spacer by varying the hardness between the spacer and the sealing material. Therefore, the inventor of the present invention conducted further studies and found that the above-mentioned problems can be solved by the invention described below.

Namely, the present invention is an electronic device comprising a first substrate, a second substrate arranged opposite the first substrate, a sealed portion arranged between the first substrate and the second substrate, and a sealing portion that connects the first substrate and the second substrate and is provided around the sealed portion; wherein, at least a portion of the sealing portion following along the periphery of the sealed portion has outer resin sealing portions respectively fixed to the first substrate and the second substrate and an intermediate resin sealing portion arranged so as to be interposed between the outer resin sealing portions between the first substrate and the second substrate, the outer resin sealing portions and the intermediate resin sealing portion contain resin, and a melt flow rate or melting point of the intermediate resin sealing portion differs from a melt flow rate or melting point of the outer resin sealing portions.

According to this electronic device, since the melt flow rate or melting point of the intermediate resin sealing portion differs from the melt flow rate or melting point of the outer resin sealing portions, one of the intermediate resin sealing portion and outer resin sealing portions becomes softer than the other. Consequently, in the case the electronic device is placed in an environment subjected to large changes in temperature, even if stress acts on the interface between the outer resin sealing portions and the intermediate resin sealing portion in the sealing portion, that stress is absorbed and adequately alleviated by the softer resin sealing portion. Thus, according to the electronic device of the present invention, decreases in sealability and adhesion between the outer resin sealing portions and the intermediate resin sealing portion can be adequately inhibited, and leakage of the sealed portion or penetration of moisture into the sealed portion from the outside can be adequately inhibited. Accordingly, durability can be maintained even in the case the electronic device is placed in an environment subjected to large changes in temperature.

In addition, as a result of one of the intermediate resin sealing portion and the outer resin sealing portions being harder than the other, even in the case the electronic device is placed in a high-temperature environment, large deformation of the sealing portion can be inhibited. Accordingly, durability can be maintained even in the case the electronic device is placed in a high-temperature environment.

In the above-mentioned electronic device, the melt flow rate of the intermediate resin sealing portion is preferably larger than the melt flow rate of the outer resin sealing portions.

According to this electronic device, since the melt flow rate of the intermediate resin sealing portion is larger than the melt flow rate of the outer resin sealing portions, the intermediate resin sealing portion becomes softer than the outer resin sealing portions. Consequently, in the case the electronic device is placed in an environment subjected to large changes in temperature, even if stress acts on the interface between the outer resin sealing portions and the intermediate resin sealing portion in the sealing portion, that stress is absorbed and adequately alleviated by the soft intermediate resin sealing portion. Thus, according to the electronic device of the present invention, decreases in sealability and adhesion between the outer resin sealing portions and the intermediate resin sealing portion can be adequately inhibited, and leakage of the sealed portion or penetration of moisture into the sealed portion from the outside can be adequately inhibited. Accordingly, durability can be maintained even in the case the electronic device is placed in an environment subjected to large changes in temperature.

In the above-mentioned electronic device, the melting point of the intermediate resin sealing portion is preferably lower than the melting point of the outer resin sealing portions.

According to this electronic device, since the melting point of the intermediate resin sealing portion is lower than the melting point of the outer resin sealing portions, the intermediate resin sealing portion becomes softer than the outer resin sealing portions. Consequently, in the case the electronic device is placed in an environment subjected to large changes in temperature, even if stress acts on the interface between the outer resin sealing portions and the intermediate resin sealing portion in the sealing portion, that stress is absorbed and adequately alleviated by the softer intermediate resin sealing portion. Thus, according to the electronic device of the present invention, decreases in sealability and adhesion between the outer resin sealing portions and the intermediate resin sealing portion can be adequately inhibited, and leakage of the sealed portion or penetration of moisture into the sealed portion from the outside can be adequately inhibited. Accordingly, durability can be maintained even in the case the electronic device is placed in an environment subjected to large changes in temperature.

The above-mentioned intermediate resin sealing portion preferably contains an acid-modified polyolefin.

In this case, adhesion between the intermediate resin sealing portion and the outer resin sealing portions becomes stronger, and leakage of the sealed portion or penetration of moisture into the sealed portion from the outside at the interface between the outer resin sealing portions and the intermediate resin sealing portion can be more adequately inhibited.

The above-mentioned intermediate resin sealing portion may contain at least one type selected from the group consisting of polyvinyl alcohol and ethylene-vinyl alcohol copolymer.

Since these resins have high gas impermeability, leakage of the sealed portion or penetration of moisture into the sealed portion from the outside in the intermediate resin sealing portion can be more adequately inhibited.

The above-mentioned outer resin sealing portions preferably contain at least one type selected from the group consisting of acid-modified polyolefins and ultraviolet cured resins.

In this case, adhesion between the first substrate, second substrate and the outer resin sealing portions becomes stronger, and leakage of the sealed portion or penetration of moisture into the sealed portion from the outside at their respective interfaces can be more adequately inhibited.

The above-mentioned outer resin sealing portions may contain at least one type selected from the group consisting of polyvinyl alcohol and ethylene-vinyl alcohol copolymer.

Since these resins have high gas impermeability, leakage of the sealed portion or penetration of moisture into the sealed portion from the outside in the outer resin sealing portions can be more adequately inhibited.

The above-mentioned electronic device is preferably further comprising a covering portion on the opposite side of the sealed portion to the sealing portion, the covering portion at least covering a boundary between the first substrate and the sealing portion, a boundary between the second substrate and the sealing portion, and the boundaries between the intermediate resin sealing portion and the outer resin sealing portions, and the covering portion containing the second resin.

In this case, leakage of the sealed portion or penetration of moisture into the sealed portion from the outside is inhibited by not only the sealing portion, but also by a covering portion. In particular, leakage of the sealed portion or penetration of moisture into the sealed portion from the outside that passes through the interface between the sealing portion and the first substrate, the interface between the sealing portion and the second substrate, and the interfaces between the intermediate resin sealing portion and the outer resin sealing portions is effectively inhibited by the covering portion.

In the above-mentioned electronic device, it is preferable that the first substrate have a porous oxide semiconductor layer, an electrically conductive film on which the porous oxide semiconductor layer is formed, and a protruding portion provided so as to protrude onto the electrically conductive film and arranged so as to be interposed between the outer resin sealing portion and the electrically conducting film, the protruding portion being composed of an inorganic material, and the sealed portion being an electrolyte.

In this case, since a protruding portion composed of an inorganic material is provided so as to protrude onto an electrically conductive film, the protruding portion fulfills the function of sealing the electrolyte used as a sealed portion together with the sealing portion. Moreover, since the protruding portion is composed of an inorganic material, it has a higher sealing capacity than the outer resin sealing portions and intermediate resin sealing portion that contain resin. Consequently, in comparison with the case of the first substrate not having a protruding portion, leakage of electrolyte or penetration of moisture into the sealed portion from the outside can be more adequately inhibited.

In addition, the present invention is a manufacturing method for an electronic device, comprising: a preparation step of preparing a first substrate and a second substrate, a first sealing portion formation step of forming a first sealing portion containing an outer resin sealing portion at a first annular site in the first substrate, a second sealing portion formation step of forming a second sealing portion containing an outer resin sealing portion at a second annular site in the second substrate, and a sealing portion formation step of forming a sealing portion obtained by laminating the first substrate and the second substrate and adhering the first sealing portion and the second sealing portion between the first substrate and the second substrate, and arranging a sealed portion so as to be surrounded by the sealing portion, the first substrate and the second substrate; wherein, at least one of the first sealing portion and the second sealing portion has an intermediate resin sealing portion provided on the outer resin sealing portions, the intermediate resin sealing portion and the outer resin sealing portions contain resin, and the melt flow rate or melting point of the intermediate resin sealing portion differs from the melt flow rate or melting point of the outer resin sealing portions.

According to this manufacturing method, since the melt flow rate or melting point of the intermediate resin sealing portion differs from the melt flow rate or melting point of the outer resin sealing portions, one of the intermediate resin sealing portion and the outer resin sealing portions is softer than the other. Consequently, in the case the electronic device is placed in an environment subjected to large changes in temperature, even if stress acts on the interface between the outer resin sealing portions and the intermediate resin sealing portion in the sealing portion, that stress is absorbed and adequately alleviated by the softer resin sealing portion. Thus, according to the manufacturing method for an electronic device of the present invention, an electronic device can be obtained in which decreases in sealability and adhesion between the outer resin sealing portions and the intermediate resin sealing portion can be adequately inhibited, and leakage of the sealed portion or penetration of moisture into the sealed portion from the outside can be adequately inhibited. Accordingly, an electronic device can be obtained in which durability can be maintained even in the case the electronic device is placed in an environment subjected to large changes in temperature.

In addition, as a result of one of the intermediate resin sealing portion and the outer resin sealing portions being harder than the other, the electronic device can be obtained in which large deformation of the sealing portion can be inhibited even in the case the electronic device is placed in a high-temperature environment. Accordingly, an electronic device can be obtained in which durability can be maintained even in the case the electronic device is placed in a high-temperature environment.

In the above-mentioned manufacturing method for an electronic device, the melt flow rate of the intermediate resin sealing portion is preferably larger than the melt flow rate of the outer resin sealing portions.

According to this manufacturing method, the melt flow rate of the intermediate resin sealing portion is larger than the melt flow rate of the outer resin sealing portions. Consequently, the intermediate resin sealing portion becomes softer than the outer resin sealing portions. Consequently, in the case the resulting electronic device is placed in an environment subjected to large changes in temperature, even if stress acts on the interface between the outer resin sealing portions and the intermediate resin sealing portion in the sealing portion, that stress is absorbed and adequately alleviated by the soft intermediate resin sealing portion. Thus, according to the manufacturing method for an electronic device of the present invention, an electronic device can be obtained in which decreases in sealability and adhesion between the outer resin sealing portions and the intermediate resin sealing portion can be adequately inhibited, leakage of the sealed portion or penetration of moisture into the sealed portion from the outside can be adequately inhibited, and eventually, durability can be maintained even in the case the electronic device is placed in an environment subjected to large changes in temperature. In addition, since the melt flow rate of the intermediate resin sealing portion is higher than the melt flow rate of the outer resin sealing portions, the fluidity of the intermediate resin sealing portion is higher than that of the outer resin sealing portions when adhering the first sealing portion and the second sealing portion in the sealing portion formation step. Consequently, when adhering the first sealing portion and the second sealing portion, even if foreign substances such as contaminants adhere to the first sealing portion or the second sealing portion, the first sealing portion and the second sealing portion are easily adhered by the intermediate resin sealing portion while containing contaminants. Consequently, the first sealing portion and the second sealing portion can be securely adhered.

In the above-mentioned manufacturing method for an electronic device, the melting point of the intermediate resin sealing portion is preferably lower than the melting point of the outer resin sealing portions.

According to this manufacturing method, the melting point of the intermediate resin sealing portion is lower than the melting point of the outer resin sealing portions. Consequently, the intermediate resin sealing portion becomes softer than the outer resin sealing portions. Consequently, in the case the resulting electronic device is placed in an environment subjected to large changes in temperature, even if stress acts on the interface between the outer resin sealing portions and the intermediate resin sealing portion in the sealing portion, that stress is absorbed and adequately alleviated by the softer intermediate resin sealing portion. Thus, according to the manufacturing method for an electronic device of the present invention, an electronic device can be obtained in which decreases in sealability and adhesion between the outer resin sealing portions and the intermediate resin sealing portion can be adequately inhibited, leakage of the sealed portion or penetration of moisture into the sealed portion from the outside can be adequately inhibited, and eventually, durability can be maintained even in the case the electronic device is placed in an environment subjected to large changes in temperature. In addition, since the melting point of the intermediate resin sealing portion is lower than the melting point of the outer resin sealing portions, the fluidity of the intermediate resin sealing portion is higher than that of the outer resin sealing portions when adhering the first sealing portion and the second sealing portion in the sealing portion formation step. Consequently, when adhering the first sealing portion and the second sealing portion, even if foreign substances such as contaminants adhere to the first sealing portion or the second sealing portion, the first sealing portion and the second sealing portion are easily adhered by the intermediate resin sealing portion while containing contaminants. Consequently, the first sealing portion and the second sealing portion can be securely adhered.

Here, the first substrate preferably contains a porous oxide semiconductor layer, the sealed portion preferably is an electrolyte, and the above-mentioned manufacturing method preferably further comprises, between the preparation step and the sealing portion forming step, a dye loading step of loading a photosensitizing dye onto the porous oxide semiconductor layer, and an electrolyte layer formation step of forming an electrolyte layer by arranging the electrolyte in the inside of the first sealing portion on the first substrate or in the inside of the second sealing portion on the second substrate, the electrolyte layer formation step is preferably carried out after at least one of the first sealing portion formation step and the second sealing portion formation step, and in the sealing portion formation step, the sealing portion is preferably formed by melting the first sealing portion and the second sealing portion under application of the pressure.

According to the above-mentioned manufacturing method, at least one of the first sealing portion formation step and the second sealing portion formation step is carried out before the electrolyte layer formation step. Consequently, in the case, for example, only the first sealing portion formation step among the first sealing formation step and the second sealing portion formation step is carried out before the electrolyte layer formation step, volatile components in the electrolyte do not adhere to the first annular site and there is no decrease in wettability of the surface thereof when forming the first sealing portion at the first annular site on the first substrate. Thus, resin is securely adhered to the first annular site and the first sealing portion is securely fixed to the first annular site.

On the other hand, the sealing portion formation step is carried out after the electrolyte layer formation step. Consequently, normally, it can be thought that a portion of the electrolyte evaporates accompanying melting of the first sealing portion and the second sealing portion, and that wettability between the first sealing portion and the second sealing portion decreases. In addition, it also can be thought that the electrolyte adheres to the first sealing portion and the second sealing portion during the electrolyte layer formation step, and that wettability between the first sealing portion and the second sealing portion decreases.

However, as described above, the melt flow rate or melting point of the intermediate resin sealing portion differs from the melt flow rate or melting point of the outer resin sealing portions. Consequently, when adhering the first sealing portion and the second sealing portion in the sealing portion formation step, the fluidity of one of the intermediate resin sealing portion and outer resin sealing portions becomes higher than the other. Consequently, even if foreign substances such as contaminants adhere to the first sealing portion or the second sealing portion when adhering the first sealing portion and the second sealing portion, the first sealing portion and the second sealing portion are adhered by the softer resin composition among the intermediate resin sealing portion and outer resin sealing portions while containing contaminants. Consequently, by the resin sealing portion containing contaminants, the first sealing portion and the second sealing portion enable the first sealing portion and the second sealing portion to be securely adhered.

In this manner, according to the above-mentioned manufacturing method, the first sealing portion is securely fixed to the first annular site of the first substrate, and the second sealing portion is securely fixed to the second annular site of the second substrate. In addition, the first sealing portion and the second sealing portion are also securely adhered to each other. Thus, in the resulting electronic device, leakage of volatile components in the electrolyte is more adequately inhibited. Moreover, penetration of moisture into the electrolyte from the outside is also more adequately inhibited. Accordingly, according to the manufacturing method for an electronic device according to the present invention, an electronic device can be manufactured in which decreases in photoelectric conversion efficiency over time can be adequately inhibited.

In the above-mentioned manufacturing method, the first substrate preferably has a porous oxide semiconductor layer, an electrically conductive film on which the porous oxide semiconductor layer is formed, and a protruding portion that is provided so as to protrude onto the electrically conductive film and that serves as the first annular site, with the protruding portion being preferably composed of an inorganic material, and the sealed portion being preferably an electrolyte.

In this case, since a protruding portion composed of an inorganic material is provided so as to protrude onto an electrically conductive film, the protruding portion fulfills the function of sealing the electrolyte used as a sealed portion together with the sealing portion. Moreover, since the protruding portion is composed of an inorganic material, it has a higher sealing capacity than the first sealing portion and second sealing portion that contain resin. Consequently, in comparison with the case of the first substrate not having a protruding portion, leakage of electrolyte or penetration of moisture into the electrolyte from the outside can be more adequately inhibited.

In the above-mentioned manufacturing method, at least one of the first substrate and the second substrate preferably has flexibility.

In this case, in comparison with the case of neither the first substrate nor the second substrate having flexibility, an electrode having flexibility among the first substrate and the second substrate is able to be bent by atmospheric pressure in the case of having been removed from a space under reduced pressure and placed at atmospheric pressure, thereby making it possible to narrow the interval between the first substrate and the second substrate. As a result, compared with the case neither the first substrate nor the second substrate has flexibility, characteristics are further improved.

Furthermore, values for melt flow rate (hereinafter abbreviated as "MFR") in the present invention refer to values measured under conditions of 190° C. and 2.16 kgs in accordance with ASTM D1238. However, in the case it is difficult to accurately measure MFR under a temperature condition of 190° C., MFR refers to values measured under a temperature condition of 210° C.

In addition, melting point in the present invention refers to a value determined by differential scanning calorimetry (DSC). Namely, melting point refers to an average value of a value obtained when temperature has risen and a value obtained when the temperature has risen again after the temperature has initially risen and dropped, with both temperature rising and dropping conditions being 1° C. per minute.

Effects of the Invention

According to the present invention, an electronic device capable of adequately maintaining durability even in the case of being placed in an environment subjected to large changes in temperature, and a manufacturing method therefor, are provided.

MODES FOR CARRYING OUT THE INVENTION

The following provides a detailed explanation of embodiments of the present invention with reference to the drawings.

Figure 1:
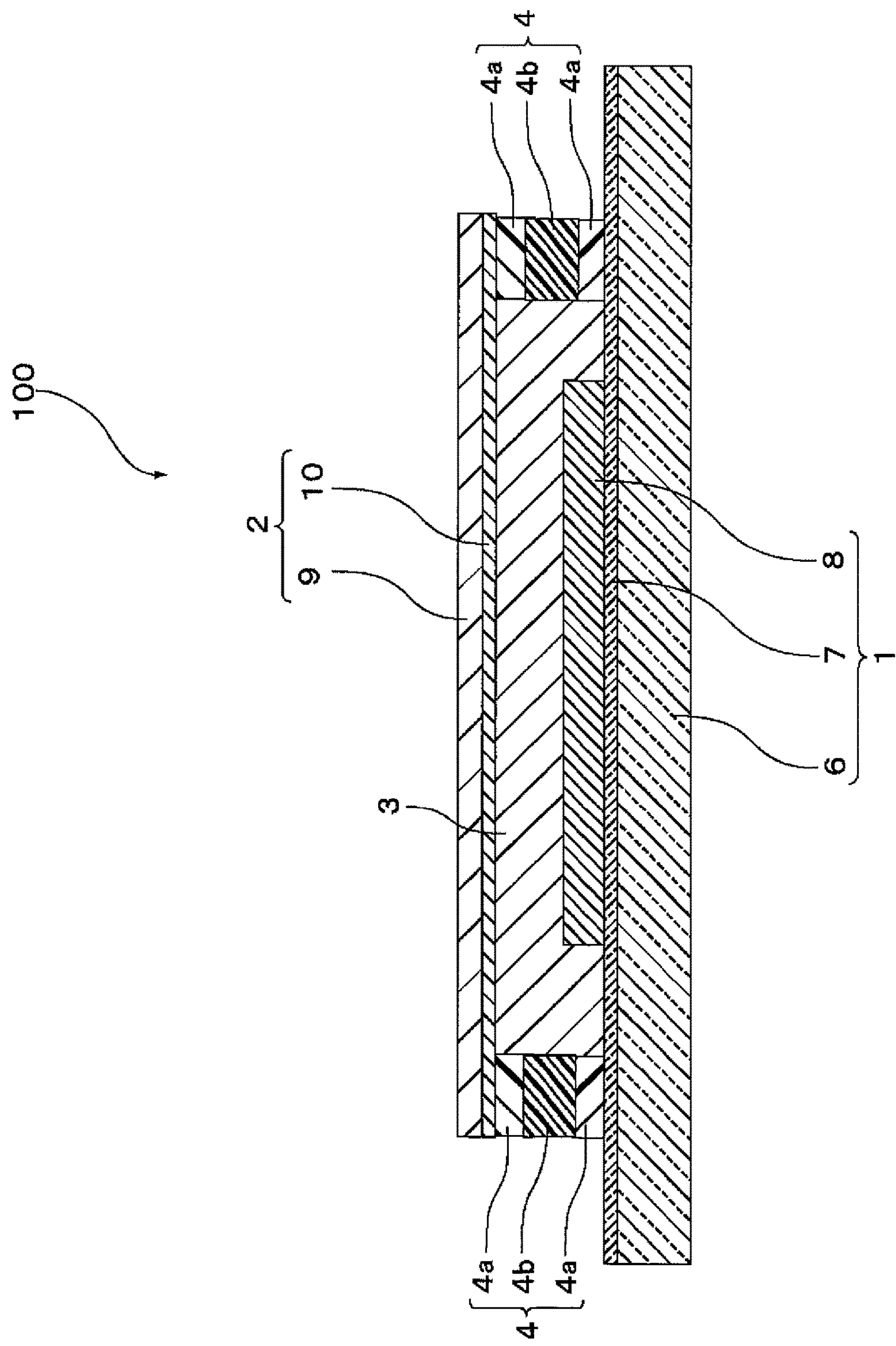
FIG. 1 is a cross-sectional view showing an embodiment of an electronic device according to the present invention.
Figure 2:
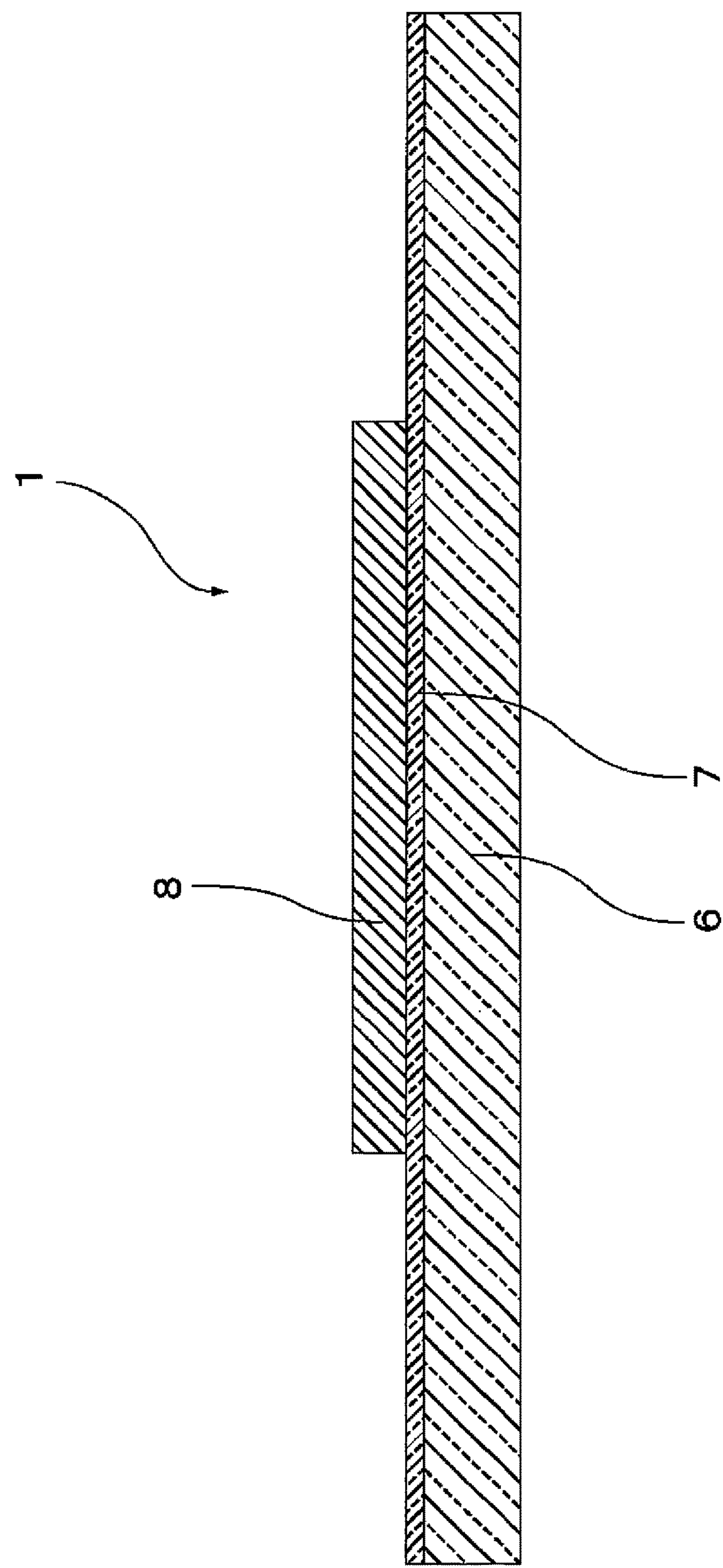
FIG. 2 is a cross-sectional view showing a first substrate of FIG. 1.
Figure 3:
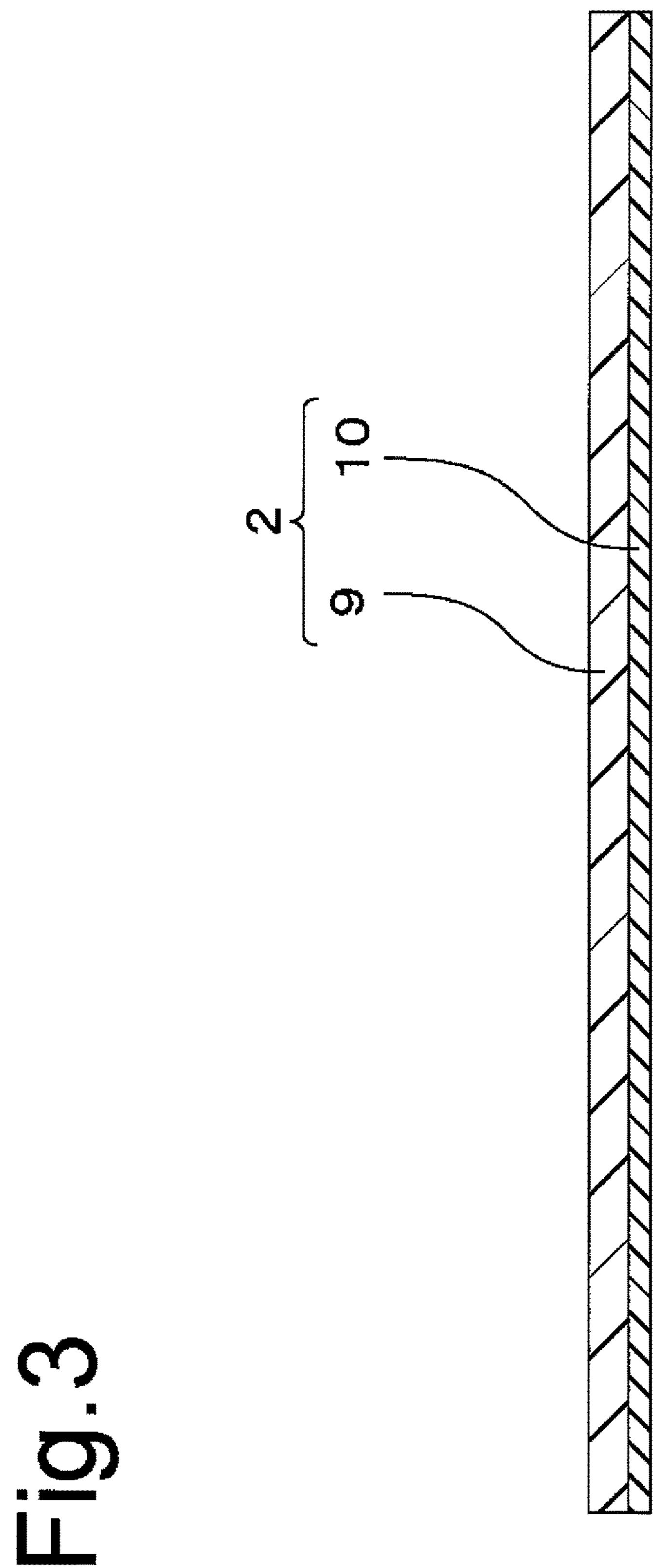
FIG. 3 is a cross-sectional view showing a second substrate of FIG. 1.
Figure 4:
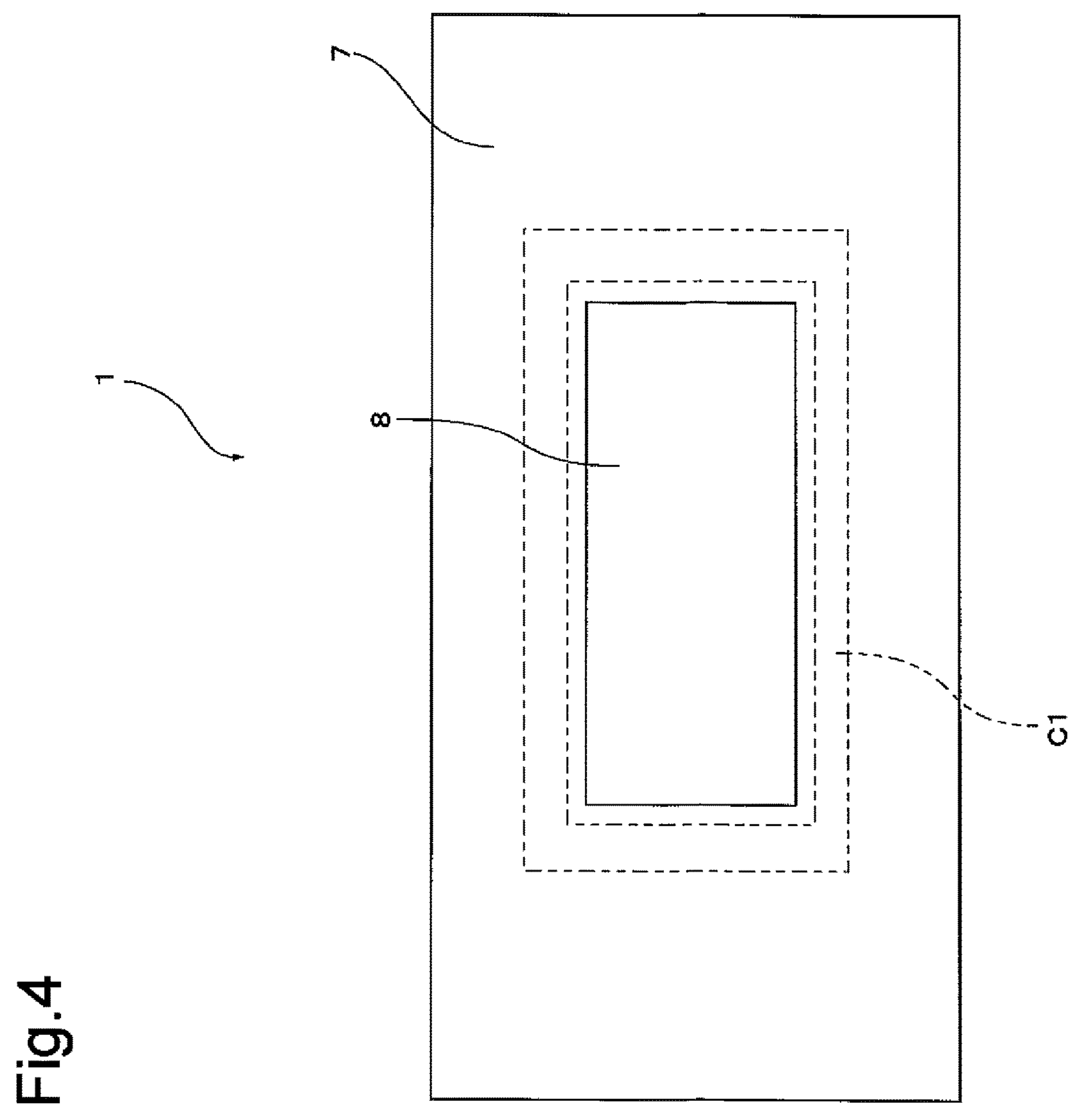
FIG. 4 is a plane view showing a first substrate of FIG. 2.
Figure 5:
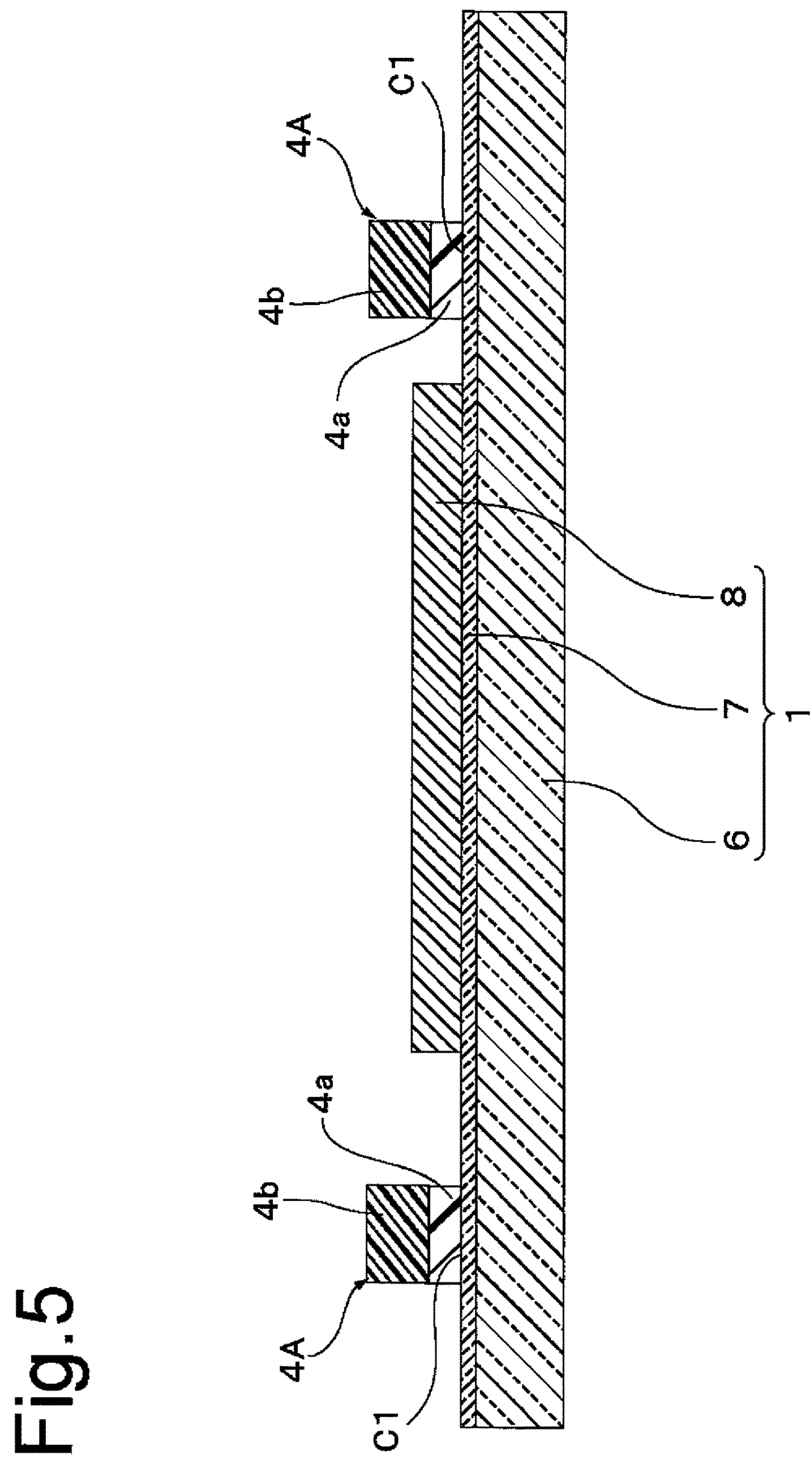
FIG. 5 is a cross-sectional view showing a step of an embodiment of a manufacturing method for an electronic device according to the present invention.
Figure 6:
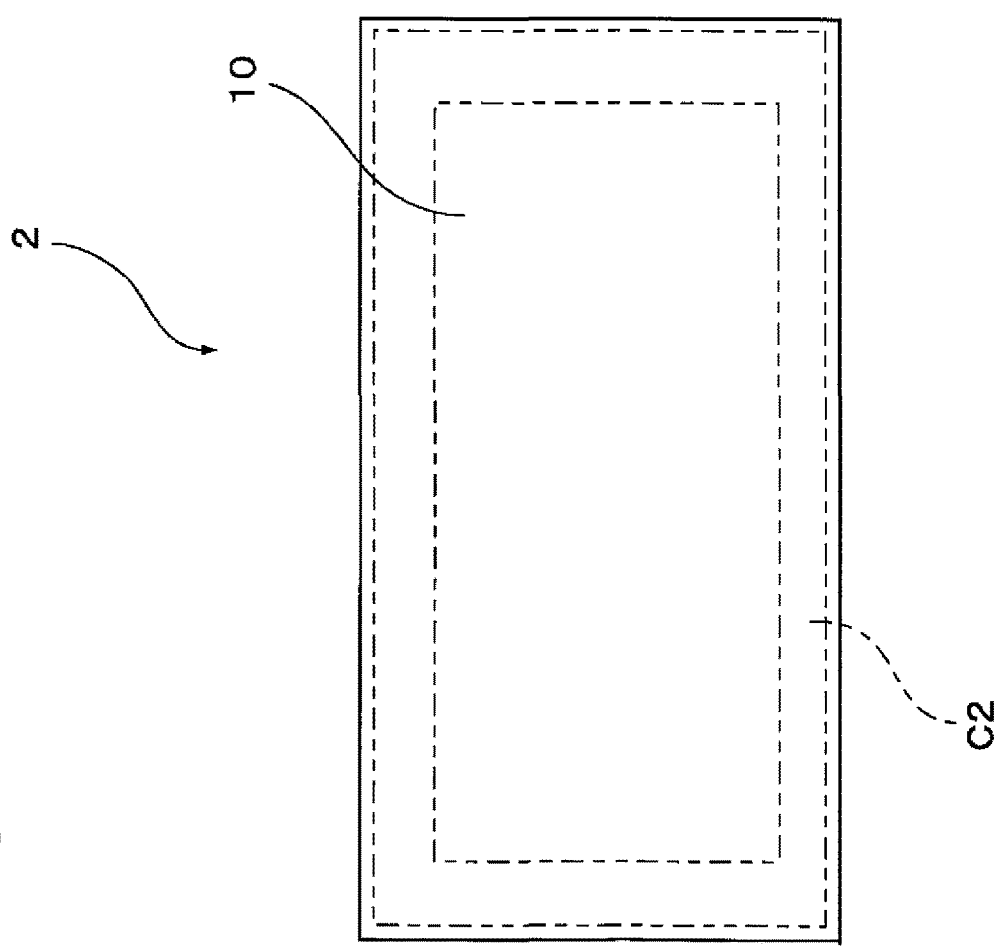
FIG. 6 is an plane view showing a second substrate of FIG. 3.

First, an explanation is provided of an embodiment of an electronic device according to the present invention using FIGS. 1 to 9. FIG. 1 is a cross-sectional view showing a dye-sensitized solar cell that is an embodiment of an electronic device according to the present invention. FIG. 2 is a cross-sectional view showing a first substrate of FIG. 1, FIG. 3 is a cross-sectional view showing a second substrate of FIG. 1, FIG. 4 is an plane view of a first substrate of FIG. 2, and FIGS. 5 and 7 to 9 are respectively cross-sectional views showing a step of a manufacturing method for the present embodiment. FIG. 6 is an plane view showing a second substrate of FIG. 3.

As shown in FIG. 1, a dye-sensitized solar cell 100 is provided with a working electrode 1, and a counter electrode 2 arranged opposite the working electrode 1. A photosensitizing dye is loaded on the working electrode 1. The working electrode 1 and the counter electrode 2 are connected by an sealing portion 4. An electrolyte is filled into a cell space surrounded by the working electrode 1, the counter electrode 2 and the sealing portion 4, and an electrolyte layer 3 is formed by this electrolyte. The electrolyte layer 3 is arranged between the working electrode 1 and the counter electrode 2, and the sealing portion 4 is provided around the electrolyte layer 3. Furthermore, in the present embodiment, the working electrode 1 is also a first substrate and a first electrode. In addition, the counter electrode 2 is a second substrate and a second electrode. In addition, the electrolyte 3 corresponds to a sealed portion.

The working electrode 1 is provided with a transparent substrate 6, a transparent electrically conductive film 7 provided on the transparent substrate 6 on the side of the counter electrode 2, and a porous oxide semiconductor layer 8 provided on the transparent electrically conductive film 7. A photosensitizing dye is loaded on the porous oxide semiconductor layer 8 of the working electrode 1. The counter electrode 2 is provided with a counter electrode substrate 9 and an electrically conductive catalyst film 10 provided on the counter electrode substrate 9 on the side of the working electrode 1 that accelerates a reduction reaction on the surface of the counter electrode 2.

The sealing portion 4 connects the working electrode 1 and the counter electrode 2, and is composed of an outer resin sealing portion **4*a* fixed to the working electrode 1, an outer resin sealing portion 4*a* fixed to the counter electrode 2, and an intermediate resin sealing portion 4*b* arranged so as to be interposed between these outer resin sealing portions 4*a*. The outer resin sealing portion 4*a* on the side of the working electrode 1 is fixed on the surface of the working electrode 1 on the side of the porous oxide semiconductor layer 8, and namely, is fixed on the surface of the transparent electrically conductive film 7. The outer resin sealing portion 4*a* on the side of the counter electrode 2 is fixed on the surface of the catalyst film 10 of the counter electrode 2. Each of the outer resin sealing portions 4*a* and the intermediate resin sealing portion 4*b* contains resin, and the MFR of the intermediate resin sealing portion 4*b* is larger than the MFR of the outer resin sealing portions 4*a***.

According to this dye-sensitized solar cell 100, since the MFR of the intermediate resin sealing portion **4*b* is larger than the MFR of the outer resin sealing portions 4*a*, the intermediate resin sealing portion 4*b* is softer than the outer resin sealing portions 4*a*. Consequently, in the case the dye-sensitized solar cell 100 is placed in an environment subjected to large changes in temperature, even if stress acts on the interface between the outer resin sealing portions 4*a* and the intermediate resin sealing portion 4*b* in the sealing portion 4, that stress is absorbed and adequately alleviated by the soft intermediate resin sealing portion 4*b*. Thus, according to the dye-sensitized solar cell 100, decreases in sealability and adhesion between the outer resin sealing portions 4*a* and the intermediate resin sealing portion 4*b* can be adequately inhibited and leakage of the electrolyte and penetration of moisture from the outside can be adequately inhibited. Accordingly, the dye-sensitized solar cell 100** is able to maintain durability even in the case of being placed in an environment subjected to large changes in temperature.

Next, an explanation is provided of a first embodiment of a manufacturing method for the above-mentioned dye-sensitized solar cell 100.

[Preparation Step]

First, the working electrode (first substrate) 1 and the counter electrode (second substrate) 2 are prepared.

(Working Electrode)

The working electrode 1 can be obtained in the manner described below (FIG. 2).

First, the transparent electrically conductive film 7 is formed on the transparent substrate 6 to form a laminate. Sputtering, vapor deposition, spray pyrolysis deposition (SPD) or CVD and the like are used as a method for forming the transparent electrically conductive film 7. Among these, spray pyrolysis deposition is preferable from the viewpoint of equipment costs.

The material that composes the transparent substrate 6 may be, for example, a transparent material, and examples of such transparent materials include glass such as borosilicate glass, soda lime glass, glass which is made of soda lime and whose iron component is less than that of ordinary soda lime glass or quartz glass, polyethylene terephthalate (PET), polyethylene naphthalate (PEN), polycarbonate (PC) and polyether sulfone (PES). The thickness of the transparent substrate 6 is suitably determined corresponding to the size of the dye-sensitized solar cell 100, and although there is no particular limitation thereon, it may be within the range of, for example, 50 μm to 10000 μm.

Examples of the material that compose the transparent electrically conductive film 7 include electrically conductive metal oxides such as indium tin oxide (ITO), tin oxide ($SnO_2$) or fluorine-doped tin oxide (FTO). The transparent electrically conductive film 7 may be composed of a single layer or a laminate of a plurality of layers composed with different electrically conductive metal oxides. In the case the transparent electrically conductive film 7 is composed of a single layer, the transparent electrically conductive film 7 is preferably composed of FTO since it has high heat resistance and chemical resistance. In addition, if a laminate composed of a plurality of layers is used for the transparent electrically conductive film 7, it is preferably able to reflect the characteristics of each layer. In particular, the use of a laminate of a layer composed of ITO and a layer composed of FTO is preferable. In this case, the transparent electrically conductive film 7 can be realized that has high electrical conductivity, high heat resistance and high chemical resistance. The thickness of the transparent electrically conductive film 7 may be within the range of, for example, 0.01 μm to 2 μm.

Next, a paste for forming a porous oxide semiconductor layer is printed onto the transparent electrically conductive film 7 obtained in the manner described above. The paste for forming the porous oxide semiconductor layer contains, in addition to oxide semiconductor particles, a resin such as polyethylene glycol and a solvent such as terpineol. Examples of methods that can be used to print the paste for forming the porous oxide semiconductor layer include screen printing, doctor blade coating and bar coating.

Next, the paste for forming the porous oxide semiconductor layer is baked to form the porous oxide semiconductor layer 8 on the transparent electrically conductive film 7. Although varying according to the oxide semiconductor particles, the baking temperature is normally 350° C. to 600° C., and although also varying according to the oxide semiconductor particles, the baking time is normally 1 hour to 5 hours.

Examples of the above-mentioned oxide semiconductor particles include titanium oxide ($TiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_3O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), aluminum oxide ($Al_2O_3$) and oxide semiconductor particles composed of two or more types thereof. A mean particle diameter of these oxide semiconductor particles of 1 nm to 1000 nm is preferable since the surface area of the oxide semiconductor coated with dye increases, namely the size of sites where photoelectric conversion takes place increases, thereby enabling the formation of a larger number of electrons. Here, the porous oxide semiconductor layer 8 is preferably composed of laminate obtained by laminating oxide semiconductor particles having different particle size distributions. In this case, light is able to be repeatedly reflected within the laminate, and light can be efficiently converted to electrons without allowing incident light to escape outside the laminate. The thickness of the porous oxide semiconductor layer 8 may be, for example, 0.5 μm to 50 μm. Furthermore, the porous oxide semiconductor layer 8 can also be composed with a laminate consisting of a plurality of semiconductor layers composed of different materials.

(Counter Electrode)

On the other hand, the counter electrode 2 can be obtained in the manner described above (FIG. 3).

Namely, the counter electrode substrate 9 is prepared. The catalyst film 10 is then formed on the counter electrode substrate 9. Sputtering, vapor deposition or the like is used as a method for forming the catalyst film 10. Among these, sputtering is preferable from the viewpoint of film uniformity.

The counter electrode substrate 9 is composed of a corrosion-resistant metal material such as titanium, nickel, platinum, molybdenum or tungsten, an electrically conductive oxide such as ITO or FTO, carbon, or an electrically conductive polymer. The thickness of the counter electrode substrate 9 is suitably determined corresponding to the size of the dye-sensitized solar cell 100, and although there are no particular limitations thereon, may be, for example, 0.005 mm to 0.1 mm.

The catalyst film 10 is composed of platinum, a carbon-based material or an electrically conductive polymer or the like.

[First Sealing Portion Formation Step]

Next, as shown in FIGS. 4 and 5, a first sealing portion 4A is formed at a first annular site C1 that is a site on the surface of the transparent electrically conductive film 7 of the working electrode 1 and that surrounds the porous oxide semiconductor layer 8. The first sealing portion 4A is composed of the outer resin sealing portion **4*a* fixed to the first annular site C1 of the transparent electrically conductive film 7 and the intermediate resin sealing portion 4*b* provided thereon. Here, the outer resin sealing portion 4*a* and the intermediate resin sealing portion 4*b* both contain resin, and that having an MFR larger than the MFR of the outer resin sealing portion 4*a* is used for the intermediate resin sealing portion 4*b***.

[Second Sealing Portion Formation Step]

Figure 7:
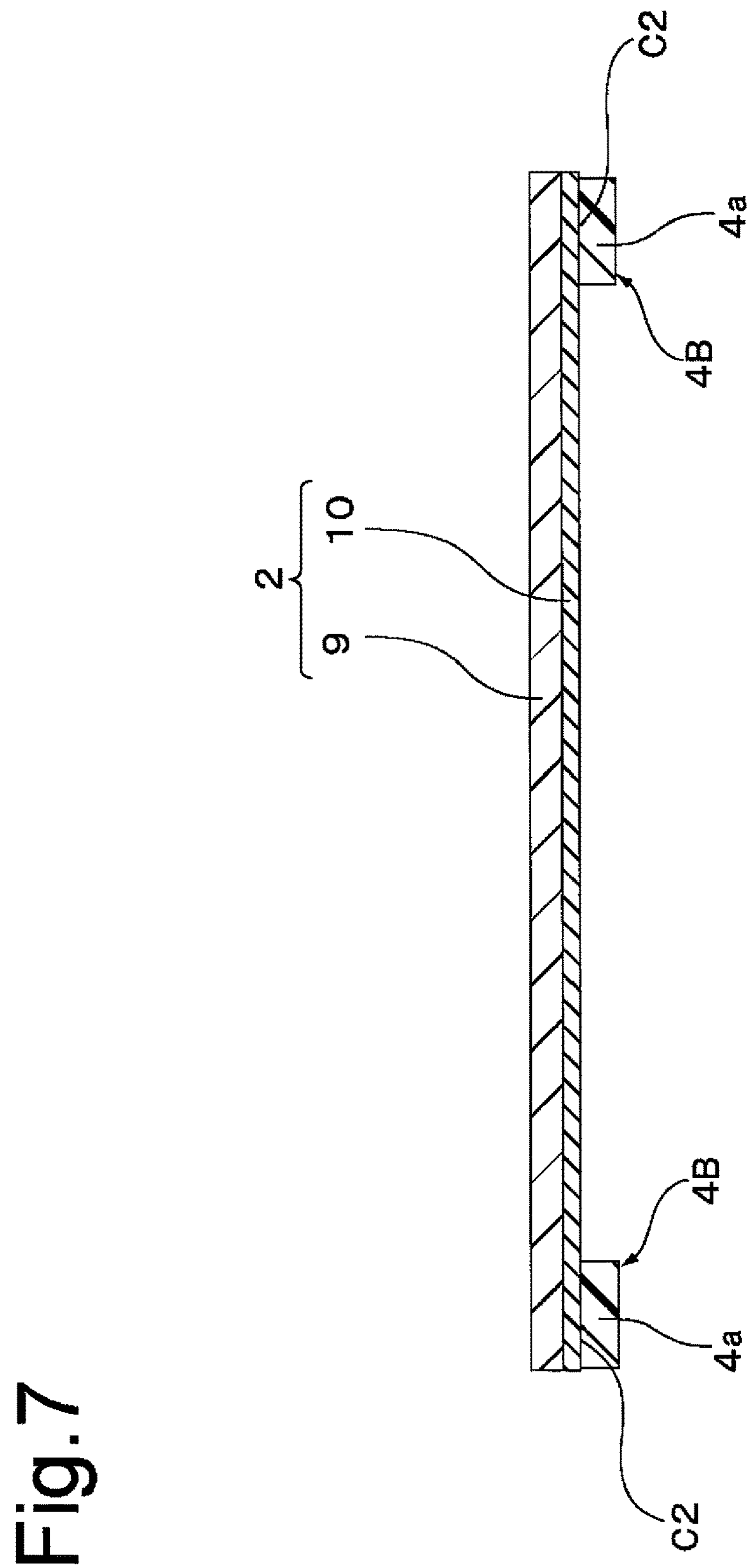
FIG. 7 is a cross-sectional view showing another step of an embodiment of a manufacturing method for an electronic device according to the present invention.

On the other hand, as shown in FIGS. 6 and 7, a second sealing portion 4B is formed on a second annular site C2 on the surface of the catalyst film 10 of the counter electrode 2. The second sealing portion 4B is composed of the outer resin sealing portion **4*a* fixed to the second annular site C2 of the catalyst film 10**.

Although the resin contained in the outer resin sealing portion **4*a*** may be any resin, examples of such resin include acid-modified polyolefin, polyvinyl alcohol, ethylene-vinyl alcohol copolymer and ultraviolet cured resin. One type of these can be used alone or two or more types can be used in combination.

(Outer Resin Sealing Portion)

In the case the outer resin sealing portion **4*a* is a thermoplastic resin such as an acid-modified polyolefin, polyvinyl alcohol or ethylene-vinyl alcohol copolymer and the like, the outer resin sealing portion 4*a* can be formed by arranging an annular sheet composed of the above-mentioned resin at the first annular site C1 of the working electrode 1 or the second annular site C2 of the counter electrode 2, followed by adhering by melting. In the case the outer resin sealing portion 4*a* is an ultraviolet cured resin, the outer resin sealing portion 4*a* can be formed by applying a precursor of the ultraviolet cured resin onto the first annular site C1 of the working electrode 1 or the second annular site C2 of the counter electrode 2**, followed by curing by irradiating with ultraviolet light.

An acid-modified polyolefin or ultraviolet cured resin among the previously listed resins is preferable as the resin of the outer resin sealing portion 4*a*. In the case an acid-modified polyolefin or ultraviolet cured resin is used for the resin contained in the outer resin sealing portion 4*a*, adhesion to the transparent electrically conductive film 7 of the working electrode 1 or to the counter electrode 2 becomes secure, and leakage of electrolyte and penetration of moisture into the electrolyte from the outside at their respective interfaces can be more adequately inhibited. The acid-modified polyolefin is preferably acid-modified polyethylene. Acid-modified polyethylene has a comparatively low melting point among acid-modified polyolefins. Consequently, in comparison with the case of using an acid-modified polyolefin other than acid-modified polyethylene for the outer resin sealing portion 4*a*, stress generated at the interface between the outer resin sealing portion 4*a* and the working electrode 1 or the counter electrode 2 can be alleviated to a greater degree. In addition, acid-modified polyethylene has particularly high stability with respect to electrolyte among acid-modified polyolefins. Consequently, the outer resin sealing portion 4*a* is able to maintain physical properties such as flexibility or adhesion of the resin contained in the outer resin sealing portion 4*a* over a long period of time.

In addition, the resin contained in the outer resin sealing portion 4*a* may also be polyvinyl alcohol or an ethylene-vinyl alcohol copolymer. Since these resins have high gas impermeability, leakage of electrolyte and penetration of moisture into the electrolyte from the outside can be more adequately inhibited in the outer resin sealing portion 4*a*. Although the above-mentioned resins may be used alone for the resin of the outer resin encapsulating portion 4*a*, two or more types may also be mixed or laminated.

(Intermediate Resin Sealing Portion)

The resin contained in the intermediate resin sealing portion 4*b* may be any resin provided it is a resin that has an MFR higher than that of the outer resin sealing portion 4*a*, and can be suitably selected from the group consisting of, for example, acid-modified polyolefin, polyvinyl alcohol and ethylene-vinyl alcohol copolymer.

In the case the intermediate resin sealing portion 4*b* is a thermoplastic resin such as an acid-modified polyolefin, polyvinyl alcohol or ethylene-vinyl alcohol copolymer, the intermediate resin sealing portion 4*b* can be formed by arranging an annular sheet of the above-mentioned resin on the outer resin sealing portion 4*a* followed by adhering by melting.

The resin contained in the intermediate resin sealing portion 4*b* is preferably an acid-modified polyolefin. In this case, adhesion to the outer resin sealing portion 4*a* becomes secure, and leakage of electrolyte and penetration of moisture into the electrolyte from the outside can be more adequately inhibited at the interface between the outer resin sealing portion 4*a* and the intermediate resin sealing portion 4*b*. Moreover, in addition to the previously described reasons, since acid-modified polyolefin is extremely stable with respect to electrolyte, it is able to maintain physical properties such as flexibility and adhesion of the resin contained in the intermediate resin sealing portion 4*b* over a long period of time. Moreover, acid-modified polyolefin also offers the following advantages since it has a comparatively low melting point in comparison with polyvinyl alcohol or ethylene-vinyl alcohol copolymer. Namely, since acid-modified polyolefin has a comparatively low melting point in comparison with other acid-modified polyolefins, the intermediate resin sealing portion 4*b* is even softer than the outer resin sealing portion 4*a* in comparison with polyvinyl alcohol or ethylene-vinyl alcohol copolymer. Consequently, in the case the dye-sensitized solar cell 100 is placed in an environment subjected to large changes in temperature, even if stress acts on the interface between the outer resin sealing portion 4*a* and the intermediate resin sealing portion 4*b* in the sealing portion 4, that stress is more adequately alleviated in comparison with the case of using polyvinyl alcohol or an ethylene-vinyl alcohol copolymer for the intermediate resin sealing portion 4*b*. In addition, since acid-modified polyolefin has a comparatively low melting point in comparison with polyvinyl alcohol or ethylene-vinyl alcohol copolymer, the outer resin sealing portion 4*a* and the intermediate resin sealing portion 4*b* easily melt and adhere at comparatively low temperature. Furthermore, an acid-modified polyolefin refers to that in which an acid has been randomly copolymerized, alternately copolymerized, block copolymerized or graft copolymerized to an olefin, or that in which these have been neutralized with metal ions. Examples of acid-modified polyolefin include ethylene-methacrylic acid copolymer, ionomer, maleic anhydride-modified polyethylene and maleic anhydride-modified polypropylene. Here, maleic anhydride-modified polypropylene, for example, is an acid-modified olefin obtained by graft copolymerization of maleic anhydride.

The resin contained in the intermediate resin sealing portion 4*b* is more preferably acid-modified polyethylene. Since acid-modified polyethylene has a comparatively low melting point in comparison with other acid-modified polyolefins, the intermediate resin sealing portion 4*b* becomes even softer than the outer resin sealing portion 4*a* in comparison with other acid-modified polyolefins. Consequently, in the case the dye-sensitized solar cell 100 is placed in an environment subjected to large changes in temperature, even if stress acts on the interface between the outer resin sealing portion 4*a* and the intermediate resin sealing portion 4*b* in the sealing portion 4, that stress is more adequately alleviated in comparison with the case of using other acid-modified polyolefin for the intermediate resin sealing portion 4*b*.

In addition, the resin contained in the intermediate resin sealing portion 4*b* may be polyvinyl alcohol or an ethylene-vinyl alcohol copolymer. Since these resins have high gas impermeability, leakage of electrolyte and penetration of moisture into the electrolyte from the outside can be more adequately inhibited in the intermediate resin sealing portion 4*b*.

The resins of the outer resin sealing portion 4*a* and the intermediate resin sealing portion 4*b* are preferably different types of acid-modified polyolefins. In this case, since the outer resin sealing portion 4*a* and the intermediate resin sealing portion 4*b* mutually have the same types of unsaturated carbon chains in molecules thereof, they demonstrate favorable compatibility as well as superior adhesion and sealability between the first sealing portion 4A and the second sealing portion 4B in the sealing portion formation step to be subsequently described.

The resins of the outer resin sealing portion 4*a* and the intermediate resin sealing portion 4*b* are more preferably the same resins selected from the group consisting of the above-mentioned acid-modified polyolefins. For example, the resin that composes the outer resin sealing portion 4*a* and the resin that composes the intermediate resin sealing portion 4*b* are preferably a combination consisting of the same ionomers, or the resin that composes the outer resin sealing portion 4*a* and the resin that composes the intermediate resin sealing portion 4*b* are preferably a combination consisting of the same maleic anhydride-modified polypropylenes.

Moreover, the resins contained in the intermediate resin sealing portion 4*b* and the outer resin sealing portion 4*a* are more preferably acid-modified polyethylenes. In this case, acid-modified polyethylenes have particularly high stability with respect to electrolyte among acid-modified polyolefins. Consequently, the intermediate resin sealing portion 4*b* and the outer resin sealing portion 4*a* are able to maintain physical properties such as flexibility and adhesion of the resins contained in the intermediate resin sealing portion 4*b* and the outer resin sealing portion 4*a* over a long period of time. Moreover, since acid-modified polyethylene has a comparatively low melting point in comparison with other acid-modified polyolefins, the resins of the outer resin sealing portion 4*a* and the intermediate resin sealing portion 4*b* easily melt and adhere at comparatively low temperature. In addition, if the resins of the outer resin sealing portion 4*a* and the intermediate resin sealing portion 4*b* are different types of acid-modified polyethylene, since the mutual monomer thereof is ethylene, they demonstrate favorable compatibility as well as superior adhesion and sealability between the first sealing portion 4A and the second sealing portion 4B in the sealing portion formation step to be subsequently described.

Here, acid-modified polyethylene refers to that in which an acid has been randomly copolymerized, alternately copolymerized, block copolymerized or graft copolymerized to polyethylene, or that in which these have been neutralized with metal ions. As an example thereof, ethylene-methacrylic acid copolymer is obtained by copolymerization of ethylene and methacrylic acid and is an acid-modified polyethylene, while an ionomer obtained by neutralizing ethylene-methacrylic acid copolymer with metal ions is also an acid-modified polyethylene.

The resins of the outer resin sealing portion 4*a* and the intermediate resin sealing portion 4*b* are more preferably the same resins selected from the group of the above-mentioned acid-modified polyethylenes. For example, the resin that composes the outer resin sealing portion 4*a* and the resin that composes the intermediate resin sealing portion 4*b* are preferably a combination consisting of the same ionomers, or the resin that composes the outer resin sealing portion 4*a* and the resin that composes the intermediate resin sealing portion 4*b* are preferably a combination consisting of the same maleic anhydride-modified polyethylenes.

Here, the same resins naturally include resins in which the molar ratio of acid monomer that modifies the polyethylene to ethylene repeating units is the same, as well as resins in which this molar ratio is different. For example, an ethylene-methacrylic acid copolymer in which the molar ratio of acid monomer to ethylene repeating units is 5% and an ethylene-methacrylic acid copolymer in which the molar ratio of acid monomer to ethylene repeating units is 10% are the same resins. In this case, since the melting points, MFR and various other thermal properties of the resins used are similar, they both easily melt and adhere at the same timing. Consequently, in comparison with the case of using resins having considerably different melting points and MFR, the heating and melting time can be easily controlled and the sealing portion formation step to be subsequently described can be carried out easily.

Specifically, examples of combinations of the outer resin sealing portion 4*a* and the intermediate resin sealing portion 4*b* are indicated below. These examples include a combination in which the resin contained in the outer resin sealing portion 4*a* is a maleic anhydride-modified polyethylene in the form of Bynel, and the resin contained in the intermediate resin sealing portion 4*b* is an ethylene-methacrylic acid copolymer in the form of Nucrel, and a combination in which the resin contained in the outer resin sealing portion 4*a* is an ionomer in the form of Himilan and the resin contained in the intermediate resin sealing portion 4*b* is an ethylene-methacrylic acid copolymer in the form of Nucrel.

Furthermore, in the case the resin contained in the outer resin sealing portion 4*a* includes at least one type of polyvinyl alcohol and ethylene-vinyl alcohol copolymer, and the resin contained in the intermediate resin sealing portion 4*b* includes at least one type of polyvinyl alcohol and ethylene-vinyl alcohol copolymer, under the presence of a trace amount of water at the interface between the outer resin sealing portion 4*a* and the intermediate resin sealing portion 4*b*, leakage of electrolyte and penetration of moisture into the electrolyte from the outside can be inhibited to a greater degree since both resins melt and adhere in the vicinity of the interface.

The difference in MFR values between the intermediate resin sealing portion 4*b* and the outer resin sealing portion 4*a* is preferably 1 g/10 min or more, and the difference between the two MFR values is more preferably 2.5 g/10 min to 25 g/10 min. The advantages described below are obtained if the difference in MFR values between the intermediate resin sealing portion 4*b* and the outer resin sealing portion 4*a* is within the above-mentioned range. Namely, if the difference between the two MFR values is 1 g/10 min or more, alleviation of stress occurs more effectively between the intermediate resin sealing portion 4*b* and the outer resin sealing portion 4*a* during thermal cycling in comparison with the case of the difference between the two MFR values being less than 1 g/10 min. In addition, in the case the difference between the two MFR values is 2.5 g/10 min to 25 g/10 min, the above-mentioned stress alleviation effect becomes more remarkable in comparison with the case of the difference being outside the above-mentioned range.

Furthermore, the resins contained in the outer resin sealing portion 4*a* and the intermediate resin sealing portion 4*b* may be composed of resin only or may be composed of resin and inorganic filler.

[Dye Loading Step]

Next, a photosensitizing dye is loaded onto the porous oxide semiconductor layer 8 of the working electrode 1. In order to accomplish this, the working electrode 1 may be immersed in a solution containing a photosensitizing dye, and after allowing the photosensitizing dye to adsorb onto the porous oxide semiconductor layer 8, excess dye may be rinsed off with a solvent component of the above-mentioned solution followed by drying to adsorb the photosensitizing dye onto the porous oxide semiconductor layer 8. However, the photosensitizing dye can also be loaded onto the porous oxide semiconductor layer 8 by adsorbing the photosensitizing dye onto an oxide semiconductor porous film by applying a solution containing the photosensitizing dye onto the porous oxide semiconductor layer 8 followed by drying.

Examples of photosensitizing dye include ruthenium complexes having a ligand containing a bipyridine structure or terpyridine structure, and organic dyes such as porphyrin, eosin, rhodamine or merocyanine.

[Electrolyte Layer Formation Step]

Figure 8:
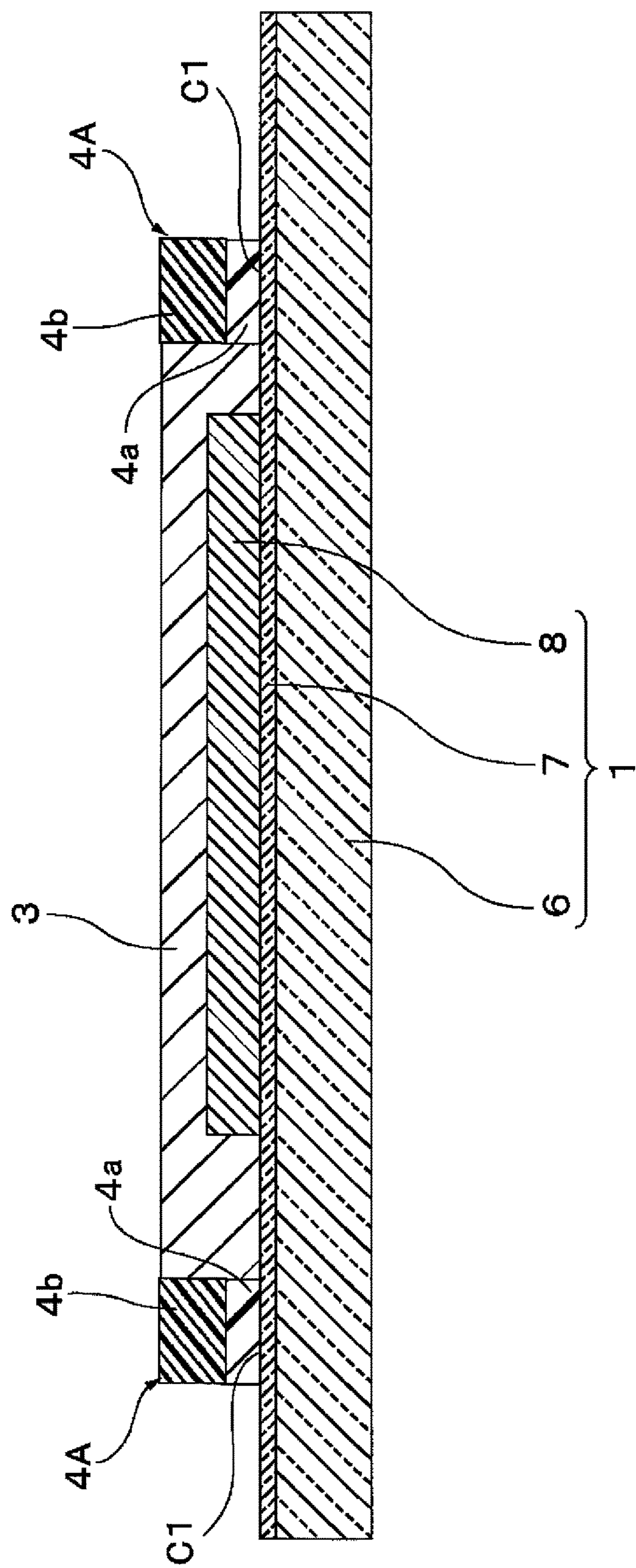
FIG. 8 is a cross-sectional view showing still another step of an embodiment of a manufacturing method for an electronic device according to the present invention.

Next, as shown in FIG. 8, electrolyte is arranged on the working electrode 1 on the inside of the first sealing portion 4A to form the electrolyte layer 3. The electrolyte layer 3 can be obtained by injecting or printing the electrolyte onto the working electrode 1 on the inside of the first sealing portion 4A.

Here, in the case the electrolyte is a liquid, the electrolyte is preferably injected beyond the first sealing portion 4A until it overflows to the outside of the first sealing portion 4A. In this case, electrolyte can be adequately injected to the inside of the first sealing portion 4A. In addition, when forming the sealing portion 4 by adhering the first sealing portion 4A and the second sealing portion 4B, air can be adequately evacuated from the cell space surrounded by the working electrode 1, the counter electrode 2 and the sealing portion 4, thereby making it possible to adequately improve photoelectric conversion efficiency. Furthermore, even if the adhesion site of the first sealing portion 4A is moistened by electrolyte as a result of injecting the electrolyte beyond the first sealing portion 4A until it overflows outside the first sealing portion 4A, since the MFR of the intermediate resin sealing portion 4*b* of the first sealing portion 4A is larger than the MFR of the outer resin sealing portion 4*a* resulting in higher fluidity, the intermediate resin sealing portion 4*b* easily contains electrolyte and contaminants when melting and adhering the first sealing portion 4A and the second sealing portion 4B. Consequently, it becomes difficult for electrolyte to be present at the interface between the first sealing portion 4A and the second sealing portion 4B when adhering the first sealing portion 4A and the second sealing portion 4B, and the first sealing portion 4A and the second sealing portion 4B are securely adhered.

The electrolyte is normally composed of an electrolytic solution, and this electrolytic solution contains, for example, a redox couple such as $I^-/I_3^-$ and an organic solvent. Examples of organic solvent include acetonitrile, methoxyacetonitrile, methoxypropionitrile, propionitrile, ethylene carbonate, propylene carbonate, diethyl carbonate, γ-butyrolactone and the like. In addition to $I^-/I_3^-$, examples of redox couples include a bromine/bromide ion couple and the like. The dye-sensitized solar cell 100 is particularly effective in the case of using for the electrolyte an electrolytic solution containing a volatile solute such as $I^-/I_3^-$ for the redox couple and an organic solvent that readily volatilizes at high temperatures, such as acetonitrile, methoxyacetonitrile or methoxypropionitrile. This is because, in this case, the change in internal pressure of the cell space caused by a change in environmental temperature around the dye-sensitized solar cell 100 becomes particularly large, electrolyte easily leaks from the interface between the sealing portion 4 and the counter electrode 2 and from the interface between the sealing portion 4 and the working electrode 1. Furthermore, a gelling agent may also be added to the above-mentioned volatile solvent. In addition, the electrolyte may also be composed of an ionic liquid electrolyte consisting of a mixture of an ionic liquid and a volatile component. In this case as well, this is due to the large change in internal pressure of the cell space caused by a change in ambient environmental temperature around the dye-sensitized solar cell 100. A known iodine salt such as a pyridinium salt, an imidazolium salt and a triazolium salt that is an ambient temperature molten salt which is in a molten state in the vicinity of room temperature is used for the ionic liquid. An example of such a ambient temperature molten salt that is used preferably is 1-ethyl-3-methylimidazolium bis(trifluoromethylsulfonyl)imide. In addition, examples of volatile components include the above-mentioned organic solvents as well as 1-methyl-3-methylimidazolium iodide, LiI, $I_2$ and 4-t-butylpyridine. Furthermore, nanocomposite ion-gel electrolyte, which is a quasi-solid electrolyte obtained by mixing the above-mentioned ionic liquid electrolyte with $SiO_2$, $TiO_2$ or nanoparticles such as carbon nanotube to form a gel may also be used for electrolyte, and ionic liquid electrolyte may be used that is obtained by gelling using an organic gelling agent such as polyvinylidene fluoride, polyethylene oxide derivatives or amino acid derivatives.

[Sealing Portion Formation Step]

Figure 9:
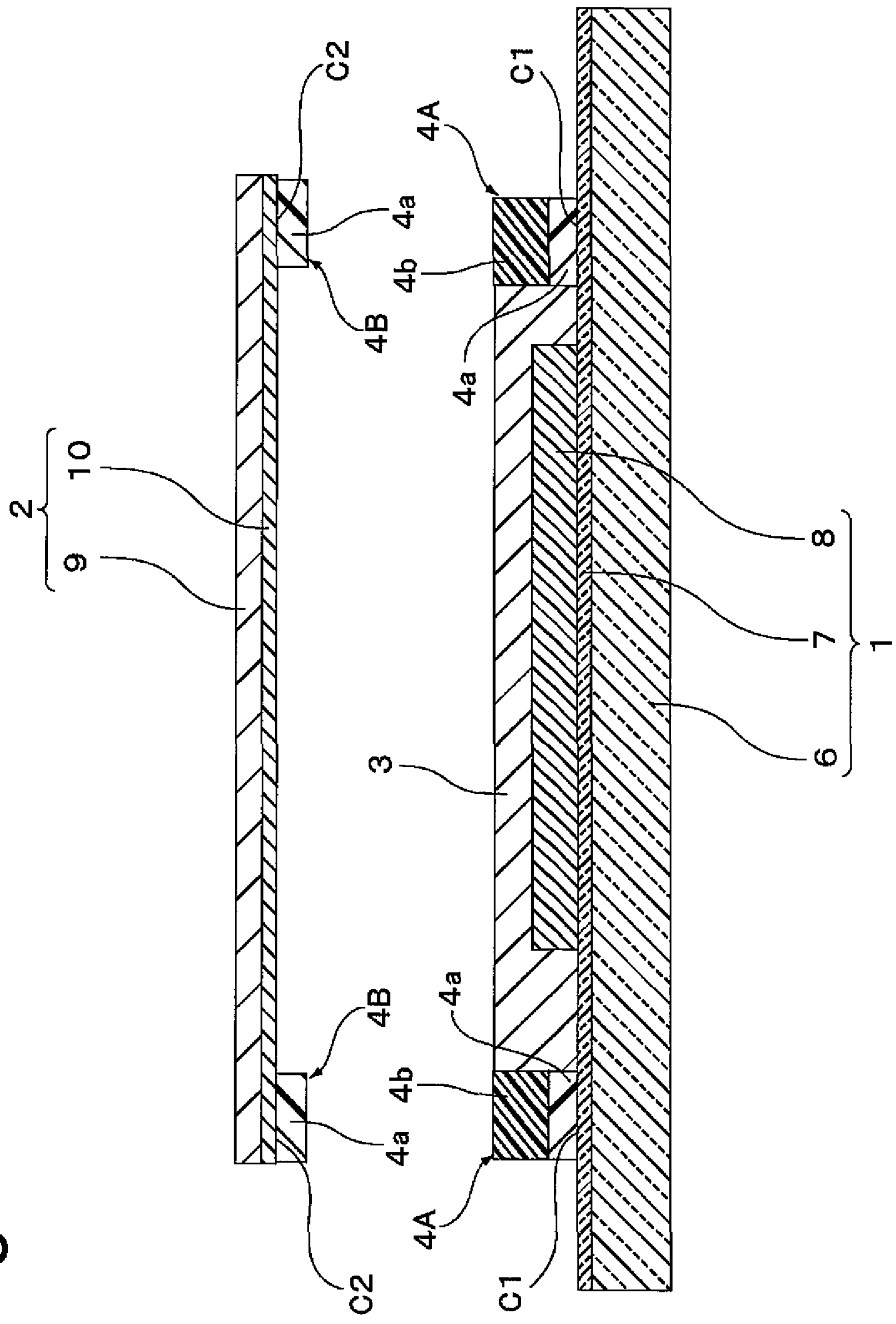
FIG. 9 is a cross-sectional view showing yet another step of an embodiment of a manufacturing method for an electronic device according to the present invention.

Next, as shown in FIG. 9, working electrode 1 and the counter electrode 2 are arranged face-to-face, and the first sealing portion 4A and the second sealing portion 4B are superimposed. The first sealing portion 4A and the second sealing portion 4B are then adhered by melting the first sealing portion 4A and the second sealing portion 4B under application of the pressure. At this time, the intermediate resin sealing portion 4*b* is adhered to the outer resin sealing portion 4*a* on the side of the working electrode 1 and the outer resin sealing portion 4*a* on the side of the counter electrode 2. In this manner, together with the working electrode 1 and the counter electrode 2 being laminated and the sealing portion 4 being formed between the working electrode 1 and the counter electrode 2, the electrolyte layer 3 is formed so as to be surrounded by the working electrode 1, the counter electrode 2 and the sealing portion 4 (see FIG. 1). In the present embodiment, the first sealing portion 4A and the second sealing portion 4B are laminated under atmospheric pressure.

At this time, the pressure applied to the first sealing portion 4A and the second sealing portion 4B is normally 1 MPa to 50 MPa, preferably 2 MPa to 30 MPa and more preferably 3 MPa to 20 MPa.

In addition, the temperature during melting of the first sealing portion 4A and the second sealing portion 4B is equal to or higher than the melting point of the outer resin sealing portion 4*a* and the intermediate sealing portion 4*b* that form the first sealing portion 4A and the second sealing portion 4B. If the above-mentioned temperature is lower than the melting point of the outer resin sealing portion 4*a* and the intermediate sealing portion 4*b*, since the outer resin sealing portion 4*a* and the intermediate resin sealing portion 4*b* do not melt, the sealing portion 4 cannot be formed by adhering the outer resin sealing portion 4*a* and the intermediate resin sealing portion 4*b*.

However, the temperature when melting the outer resin sealing portion 4*a* and the intermediate resin sealing portion 4*b* is preferably equal to or lower than the (melting point of the resin contained in the outer resin sealing portion 4*a*+200° C.). If the above-mentioned temperature exceeds the (melting point of the resin contained in the outer resin sealing portion 4*a*+200° C.), there is the risk of the resins contained in the outer resin sealing portion 4*a* and the intermediate resin sealing portion 4*b* being decomposed by heat.

The dye-sensitized solar cell 100 is obtained in this manner and manufacturing of the dye-sensitized solar cell 100 is completed.

According to the manufacturing method for the dye-sensitized solar cell 100 as described above, the MFR of the intermediate resin sealing portion 4*b* is larger than the MFR of the outer resin sealing portion 4*a*. Consequently, the intermediate resin sealing portion 4*b* becomes softer than the outer resin sealing portion 4*a*. Consequently, in the case the resulting dye-sensitized solar cell 100 is placed in an environment subjected to large changes in temperature, even if stress acts at the interface between the outer resin sealing portion 4*a* and the intermediate resin sealing portion 4*b* in the sealing portion 4, that stress is absorbed and adequately alleviated by the softer intermediate resin sealing portion 4*b*.

Thus, according to the manufacturing method for the dye-sensitized solar cell 100, the dye-sensitized solar cell 100 can be obtained in which decreases in sealability and adherence between the outer resin sealing portion 4*a* and the intermediate resin sealing portion 4*b* are adequately inhibited, leakage of electrolyte and penetration of moisture into the electrolyte from the outside are adequately inhibited, and eventually, durability can be maintained even in the case of being placed in an environment subjected to large changes in temperature.

In addition, if the outer resin sealing portion 4 is harder than the intermediate resin sealing portion 4*b*, even in the case the dye-sensitized solar cell 100 is placed in a high-temperature environment, large deformation of the sealing portion 4 can be inhibited. Accordingly, the dye-sensitized solar cell 110 is also able to maintain durability even in the case of being placed in a high-temperature environment.

In addition, in the present embodiment, the first sealing portion 4A and the second sealing portion 4B are formed prior to forming the electrolyte layer 3. Consequently, volatile components in the electrolyte are not adhered at the first annular site C1 when forming the first sealing portion 4A at the first annular site C1 of the working electrode, and there is no decrease in the surface wettability thereof. Thus, thermoplastic resin is securely adhered to the first annular site C1 and the first sealing portion 4A is securely fixed to the first annular site C1. In addition, volatile components in the electrolyte are also not adhered on the surface of the catalyst film 10 when forming the second sealing portion 4B at the second annular site C2 of the catalyst film 10, and there is no decrease in the surface wettability thereof. Thus, thermoplastic resin is securely adhered to the second annular site C2 of the catalyst film 10, and the second sealing portion 4B is securely fixed to the second annular site C2 of the catalyst film 10.

On the other hand, the sealing portion 4 is formed after having formed the electrolyte layer 3. Consequently, under normal circumstances, a portion of the electrolyte evaporates accompanying melting of the first sealing portion 4A and the second sealing portion 4B, and this is thought to cause a decrease in wettability between the first sealing portion 4A and the second sealing portion 4B. In addition, the electrolyte adheres to the first sealing portion 4A and the second sealing portion 4B during the electrolyte layer formation step, and this is also thought to cause a decrease in wettability between the first sealing portion 4A and the second sealing portion 4B.

However, as described above, since the MFR of the intermediate resin sealing portion 4*b* is higher than the MFR of the outer resin sealing portion 4*a*, when adhering the first sealing portion 4A and the second sealing portion 4B in the sealing portion formation step, the fluidity of the intermediate resin sealing portion 4*b* becomes higher than that of the outer resin sealing portion 4*a*. Consequently, when adhering the first sealing portion 4A and the second sealing portion 4B, even if foreign substances such as contaminants (e.g., electrolyte) adhere to the first sealing portion 4A or the second sealing portion 4B, the intermediate resin sealing portion 4*b* is easily adhered to the outer resin sealing portion 4*a* of the second sealing portion 4A with the intermediate resin sealing portion containing the contaminants. Consequently, the first sealing portion 4A and the second sealing portion 4B can be securely adhered.

In this manner, according to the manufacturing method for the dye-sensitized solar cell 100, the first sealing portion 4A is securely fixed to the first annular site C1 of the working electrode 1, and the second sealing portion 4B is securely fixed to the second annular site C2 of the counter electrode 2. In addition, the first sealing portion 4A and the second sealing portion 4B are also securely adhered to each other. Thus, in the resulting dye-sensitized solar cell 100, leakage of volatile components in the electrolyte is more adequately inhibited. Moreover, penetration of moisture into the electrolyte from the outside is also more adequately inhibited. Accordingly, according to the manufacturing method for the dye-sensitized solar cell 100, a dye-sensitized solar cell can be manufactured in which decreases in photoelectric conversion efficiency over time can be adequately inhibited.

In addition, in the present embodiment, the electrolyte layer 3 is formed on the working electrode 1 on the inside of the first sealing portion 4A in the electrolyte layer formation step. Consequently, the sealing portion 4 is formed after electrolyte has adequately spread into the narrowest parts of the pores of the porous oxide semiconductor layer 8. Consequently, the appearance of air in the form of bubbles in the porous oxide semiconductor layer 8 is adequately inhibited, and photoelectric conversion efficiency can be more adequately improved.

Next, an explanation is provided of a second embodiment of the manufacturing method for the dye-sensitized solar cell 100. Furthermore, the same reference symbols are used in the present embodiment to indicate those constituents that are identical or equivalent to those of the first embodiment, and overlapping explanations thereof are omitted.

The manufacturing method of the present embodiment differs from the manufacturing method of the first embodiment in that, although adhesion of the first sealing portion 4A and the second sealing portion 4B is carried out at atmospheric pressure in the first embodiment, adhesion of the first sealing portion 4A and the second sealing portion 4B is carried out in a reduced pressure space in the present embodiment.

In this case, the electrolyte layer 3 can be made to be at negative pressure relative to the outside air when the resulting dye-sensitized solar cell 100 is removed into the atmosphere. Consequently, the dye-sensitized solar cell 100 is subjected to atmospheric pressure from the outside, and a state is maintained in which the working electrode 1 and the counter electrode 2 apply pushing pressure to the sealing portion 4. As a result, leakage of volatile components in the electrolyte layer 3 can be more adequately inhibited.

The above-mentioned reduced pressure space can be formed, for example, in the manner described below.

Namely, the working electrode 1, provided with the first sealing portion 4A, is first housed in a pressure reduction vessel having an opening through the opening thereof. Successively, electrolyte is injected into the inside of the first sealing portion 4A to form the electrolyte layer 3. Subsequently, the counter electrode 2 provided with the second sealing portion 4B is further housed in the pressure reduction vessel, and the working electrode 1 and the counter electrode 2 are arranged face-to-face in the pressure reduction vessel to superimpose the first sealing portion 4A and the second sealing portion 4B. Next, the opening of the pressure reduction vessel is covered with a flexible sheet composed of a resin such as PET to form a sealed space within the pressure reduction vessel. The pressure in the sealed space is then reduced through an exhaust hole (not shown) formed in the pressure reduction vessel using, for example, a vacuum pump. A depressurized space is formed in this manner.

When the depressurized space is formed in this manner, the counter electrode 2 is subjected to pushing pressure by the above-mentioned flexible sheet. Accompanying this, the first sealing portion 4A and the second sealing portion 4B are interposed and pressurized by the working electrode 1 and the counter electrode 2. At this time, when the pressure reduction vessel is heated and the first sealing portion 4A and the second sealing portion 4B are melted while applying pressure, the first sealing portion 4A and the second sealing portion 4B are adhered to form the sealing portion 4.

At that time, the pressure of the depressurized space is normally made to be within the range of 50 Pa or more and less than 1013 hPa, preferably 50 Pa to 800 Pa and more preferably 300 Pa to 800 Pa.

In the case the organic solvent contained in the electrolyte is a volatile solvent in particular, the pressure inside the depressurized space is preferably 700 Pa to 1000 Pa and more preferably 700 Pa to 800 Pa. If the pressure is within the above-mentioned ranges, volatilization of the organic solvent when forming the electrolyte layer 3 on the inside of the first sealing portion 4A can be further inhibited in comparison with the case the pressure being outside the above-mentioned ranges, and the working electrode 1, the counter electrode 2 and the sealing portion 4 are mutually more securely fixed in the resulting dye-sensitized solar cell 100, thereby reducing probability of the occurrence of leakage of the electrolyte layer 3.

In addition, in the case the electrolyte contains an ionic liquid, it is not necessary to increase the pressure in the depressurized space in consideration of volatilization of the electrolyte as in the case of the electrolyte containing a volatile solvent since ionic liquid does not volatilize. Consequently, the pressure inside the depressurized space may be 50 Pa to 700 Pa.

Moreover, in the case the electrolyte contains a gel electrolyte, since the case in which the main component of the precursor to be gelled is a volatile substance and the case in which it is an ionic liquid differ, 600 Pa to 800 Pa is preferable in the case the main component of the precursor is a volatile substance, and 50 Pa to 700 Pa is preferable in the case it is an ionic liquid. Thus, in the case the electrolyte layer 3 contains a gel electrolyte, the pressure inside the depressurized space is preferably 50 Pa to 800 Pa.

In addition, in the case of forming the sealing portion 4 inside the depressurized space as described above, at least one of the working electrode 1 and the counter electrode 2 preferably has flexibility.

In this case, in comparison with the case of neither the working electrode 1 nor the counter electrode 2 having flexibility, the electrode having flexibility among the working electrode 1 and the counter electrode 2 is bent by atmospheric pressure in the case of being removed from the depressurized space and placed at atmospheric pressure, thereby enabling the interval between the working electrode 1 and the counter electrode 2 to be narrowed. As a result, in comparison with the case of neither the working electrode 1 nor the counter electrode 2 having flexibility, photoelectric conversion is carried out with greater efficiency and photoelectric conversion efficiency is further improved.

Figure 10:
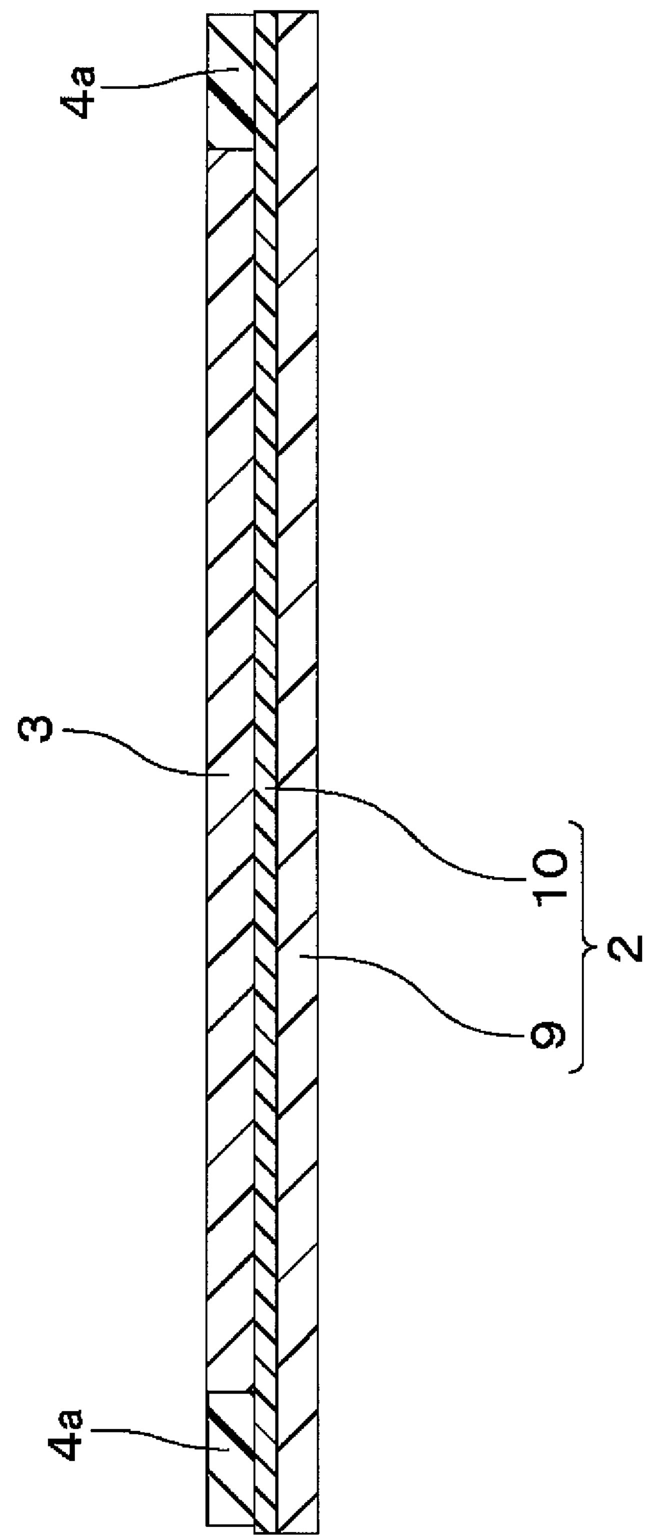
FIG. 10 is a cross-sectional view showing a step of another embodiment of a manufacturing method for an electronic device according to the present invention.

The present invention is not limited to the above-mentioned embodiments. For example, although the electrolyte layer 3 is formed on the inside of the first sealing portion 4A provided on the working electrode 1 in the above-mentioned embodiments, as shown in FIG. 10, it may also be formed on the counter electrode 2 and on the inside of the second sealing portion 4B provided on the counter electrode 2.

Moreover, although the first sealing portion 4A and the second sealing portion 4B are formed prior to forming the electrolyte layer 3 in the above-mentioned embodiments, the second sealing portion 4B may be formed simultaneous to formation of the electrolyte layer 3 or may be formed after having formed the electrolyte layer 3. However, in the case the electrolyte layer 3 is formed on the inside of the second sealing portion 4B provided on the counter electrode 2, formation of the second sealing portion 4B is required to be carried out prior to forming the electrolyte layer 3. In this case, the first sealing portion 4A is not required to be formed prior to forming the electrolyte layer 3, but may also be formed simultaneous to formation of the electrolyte layer 3, or may be formed after having formed the electrolyte layer 3 prior to forming the sealing portion 4. At this time, the dye loading step is also carried out prior to forming the sealing portion 4.

Figure 11:
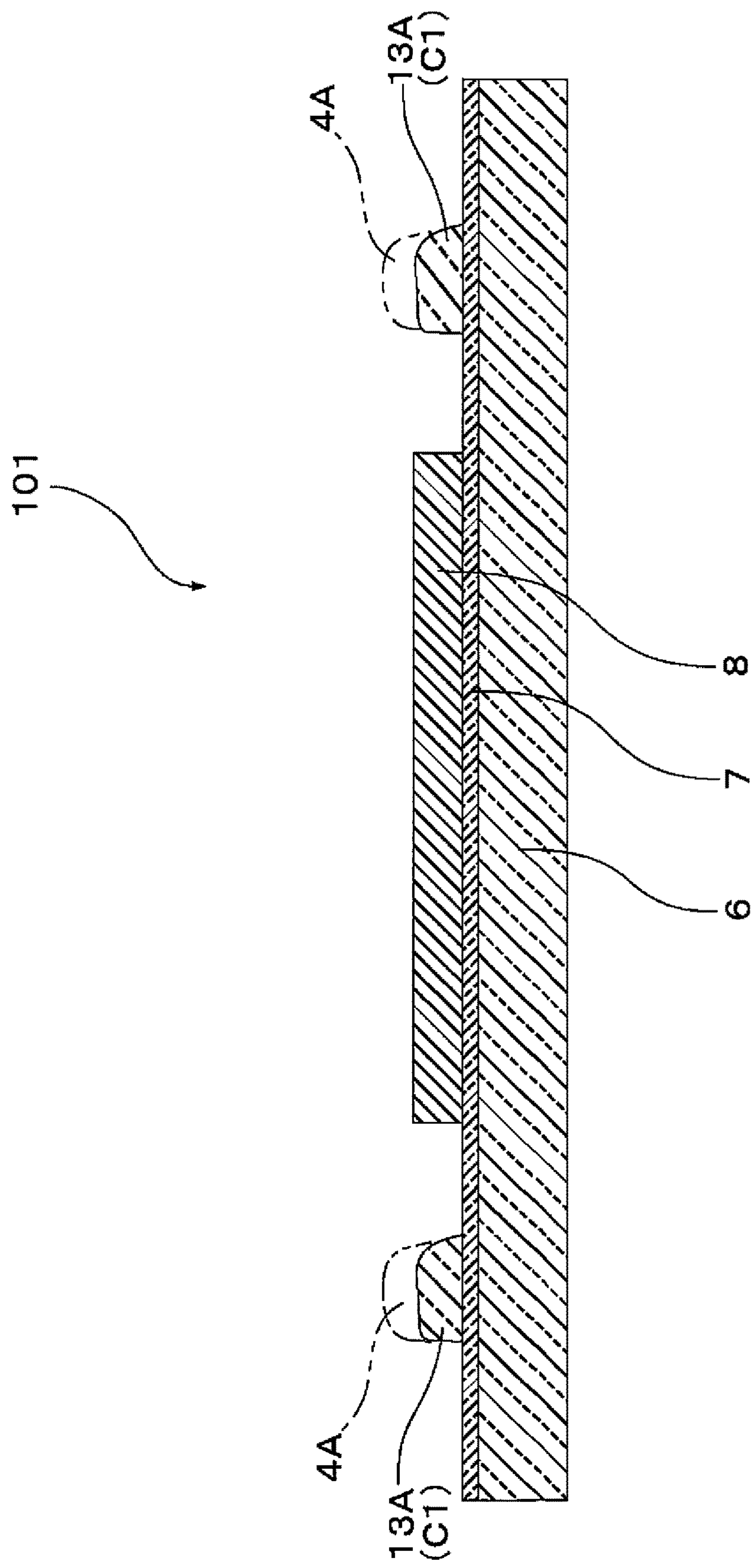
FIG. 11 is a cross-sectional view showing a variation of a first substrate of FIG. 1.

In addition, a working electrode 101 further having a protruding portion 13A composed of an inorganic material so as to protrude onto the transparent electrically conductive film 7 as shown in FIG. 11 may be used instead of the working electrode 1 in the above-mentioned embodiments. This protruding portion 13A is a site on which the first sealing portion 4A is formed, and serves as the first annular site C1.

In this case, since the protruding portion 13A composed of an inorganic material is provided so as to protrude onto the transparent electrically conductive film 7, it fulfills the function of sealing the electrolyte layer 3 together with the sealing portion 4. Moreover, since the protruding portion 13A is composed of an inorganic material, it has higher sealing ability than the first sealing portion 4A and the second sealing portion 4B composed of thermoplastic resin. Consequently, in comparison with the case of the working electrode 1 not having the protruding portion 13A, leakage of electrolyte can be more adequately inhibited.

Figure 12:
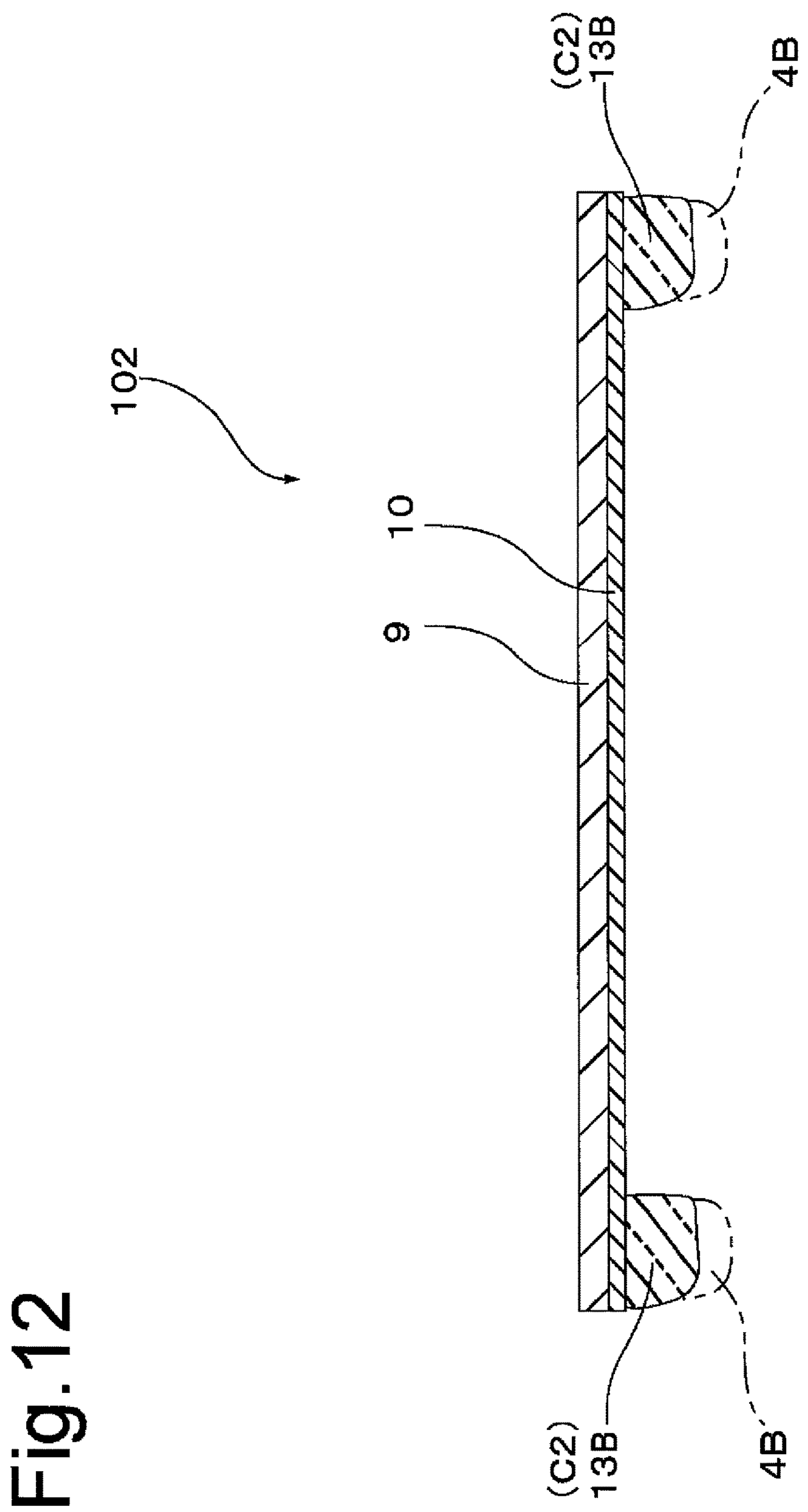
FIG. 12 is a cross-sectional view showing a variation of a second substrate of FIG. 1.

In addition, a counter electrode 102 further having a protruding portion 13B composed of an inorganic material so as to protrude onto the catalyst film 10 as shown in FIG. 12 can also be used in the above-mentioned embodiments. This protruding portion 13B is a site on which the second sealing portion 4B is formed, and serves as the second annular site C2.

In this case, since the protruding portion 13B composed of an inorganic material is provided so as to protrude onto the catalyst film 10, it fulfills the function of sealing the electrolyte layer 3 together with the sealing portion 4. Moreover, since the protruding portion 13B is composed of an inorganic material, it has higher sealing ability than the first sealing portion 4A and the second sealing portion 4B composed of thermoplastic resin. Consequently, in comparison with the case of the counter electrode 2 not having the protruding portion 13B, leakage of electrolyte can be more adequately inhibited.

An inorganic insulating material such as lead-free, transparent glass frit having a low melting point or a metal material such as silver can be used, for example, for the inorganic material that composes the protruding portions 13A and 13B. In particular, a wiring portion typically formed on the working electrode 1 preferably serves as the protruding portion 13A. In this case, electrolyte is arranged between the working electrode 1 and the counter electrode 2. Thus, the protruding portion 13A has a wiring portion, and the wiring portion has current collector wiring and a wiring protective layer that covers the current collector wiring. In other words, the current collector wiring is arranged so as to overlap the sealing portion 4 along a direction that connects the working electrode 1 and the counter electrode 2 while protected from the electrolyte by the wiring protective layer. In this manner, since current collector wiring is not provided on the outside of the sealing portion 4 and, moreover, current collector wiring is also not provided on the inside of the sealing portion 4, the area occupied by the current collector wiring and the sealing portion 4 in the light incident surface of the working electrode can be minimized, thereby making it possible to hold the incident light shielded by the current collector wiring and the sealing portion 4 to a minimum. Thus, the light receiving surface area can be increased and high photoelectric conversion efficiency can be obtained. Here, the current collector wiring is formed with a metal material such as silver, and the wiring protective layer is composed of an inorganic insulating material such as low melting point glass frit.

Moreover, although the second sealing portion 4B is composed only of the outer resin sealing portion 4*a* and does not include the intermediate resin sealing portion 4*b* in the above-mentioned embodiments, the second sealing portion 4B may also include the intermediate resin sealing portion 4*b*.

In addition, although the intermediate resin sealing portion 4*b* only consists of a single layer in the above-mentioned embodiments, the intermediate resin sealing portion 4*b* may also be a laminate consisting of a plurality of intermediate resin sealing portions having different MFR. In this case, the intermediate resin sealing portion is laminated in a direction that connects the working electrode 1 and the counter electrode 2. Here, arranging the intermediate resin encapsulating portions so that the MFR value of each layer of the intermediate resin encapsulating portion in the laminate sequentially increases in order starting from the side of the counter electrode 2, for example, is preferable since stress at each interface between the intermediate resin sealing portions can be effectively reduced.

Figure 13:
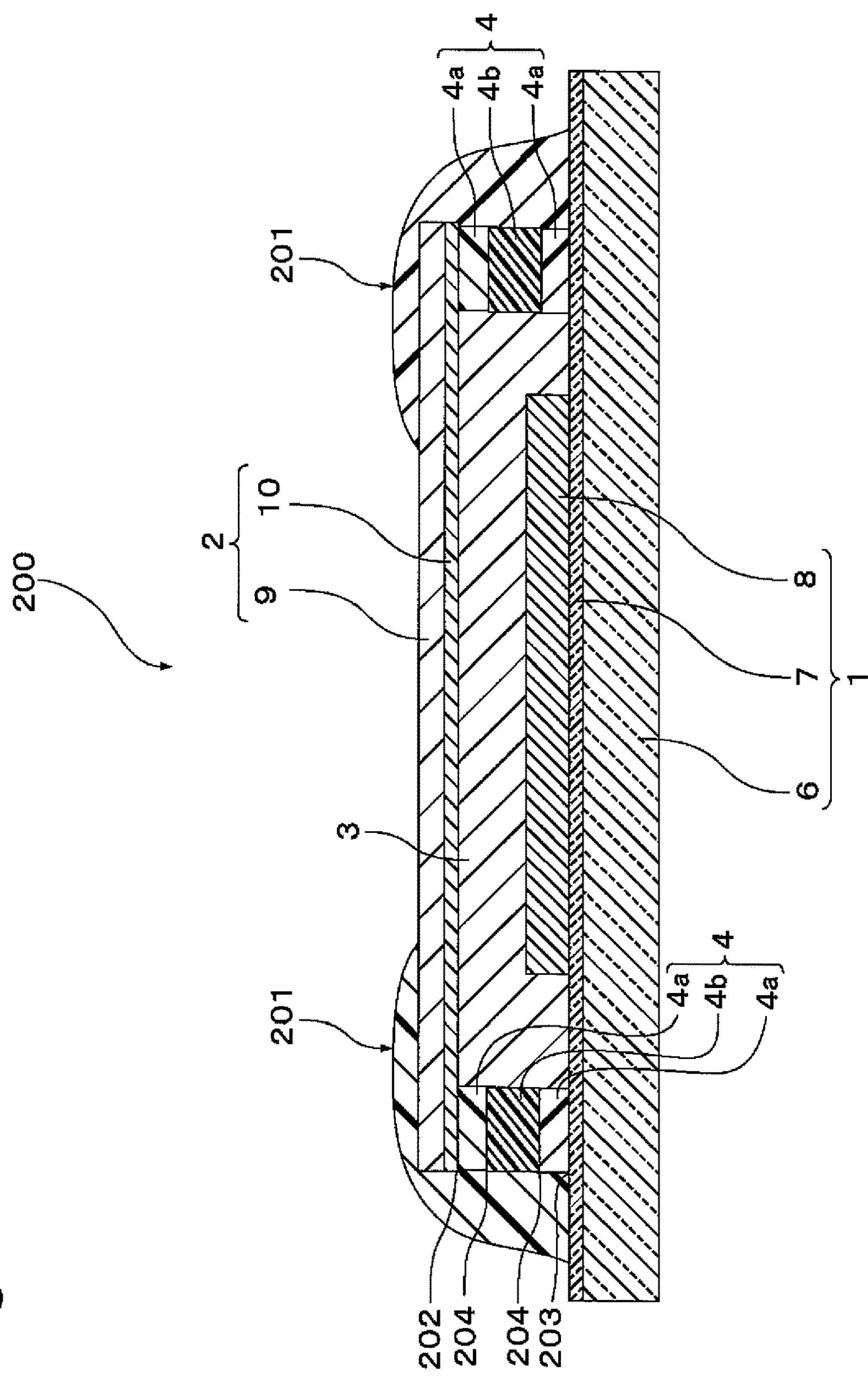
FIG. 13 is a cross-sectional view showing another embodiment of an electronic device according to the present invention.

In addition, a covering portion 201, which covers a boundary 202 between the sealing portion 4 and the counter electrode 2, a boundary 203 between the sealing portion 4 and the working electrode 1, and boundaries 204 between the intermediate resin sealing portion 4*b* and the outer resin sealing portions 4*a*, may be provided on the opposite side of the electrolyte layer 3 to the sealing portion 4 in the manner of a dye-sensitized solar cell 200 shown in FIG. 13. In this case, the covering portion 201 contains a second resin. In this case, leakage of electrolyte or penetration of moisture into the electrolyte from the outside is inhibited by not only the sealing portion 4, but also by the covering portion 201. In particular, leakage from the interface of the electrolyte or penetration of moisture into the electrolyte from the outside that passes through the interface 203 between the sealing portion 4 and the working electrode 1, the interface 202 between the sealing portion 4 and the counter electrode 2, and the interfaces 204 between the intermediate resin sealing portion 4*b* and the outer resin sealing portions 4*a* is effectively inhibited by the covering portion 201.

Examples of the above mentioned second resins include acid-modified polyolefin, ultraviolet cured resin, polyvinyl alcohol or ethylene-vinyl alcohol copolymer. In the case of using an acid-modified polyolefin or ultraviolet cured resin for the second resin, the working electrode 1, the counter electrode 2 and the sealing portion 4 are securely adhered, and leakage of electrolyte and penetration of moisture into the electrolyte from the outside at each of the interfaces 202, 203 and 204 can be more adequately inhibited.

In addition, although the dye loading step is carried out after the first sealing portion formation step in the above-mentioned embodiments from the viewpoint of reducing thermal damage to the dye, the dye loading step may also be carried out prior to the first sealing portion formation step.

In addition, although the MFR of the intermediate resin sealing portion 4*b* is larger than the MFR of the outer resin sealing portion 4*a* in the above-mentioned embodiments, the MFR of the intermediate resin sealing portion 4*b* may also be smaller than the MFR of the outer resin sealing portion 4*a*. Namely, the MFR of the intermediate resin sealing portion 4*b* and the MFR of the outer resin sealing portion 4*a* may be different. In this case, since the MFR of the intermediate resin sealing portion 4*b* and the MFR of the outer resin sealing portion 4*a* differ, one of the intermediate resin sealing portion 4*b* and the outer resin sealing portion 4*a* is softer than the other. Consequently, in the case the dye-sensitized solar cell 100 is placed in an environment subjected to large changes in temperature, even if stress acts on the interface between the outer resin sealing portion 4*a* and the intermediate resin sealing portion 4*b* in each of the first sealing portion 4A and the second sealing portion 4B, that stress is absorbed and adequately alleviated by the softer resin sealing portion. Thus, decreases in sealability and adhesion between the outer resin sealing portion 4*a* and the intermediate resin sealing portion 4*b* can be adequately inhibited, and leakage of electrolyte or penetration of moisture into the electrolyte from the outside can be adequately inhibited. Accordingly, durability can be maintained even in the case the dye-sensitized solar cell 100 is placed in an environment subjected to large changes in temperature.

In addition, although the MFR of the outer resin sealing portion 4*a* and the MFR of the intermediate resin sealing portion 4*b* differ in the above-mentioned embodiments, the melting point of the outer resin sealing portion 4*a* and the melting point of the intermediate resin sealing portion 4*b* may also differ. In this case as well, similar to the case of the MFR of the outer resin sealing portion 4*a* and the MFR of the intermediate resin sealing portion 4*b* differing, decreases in sealability and adhesion between the outer resin sealing portion 4*a* and the intermediate resin sealing portion 4*b* can be adequately inhibited, and leakage of electrolyte or penetration of moisture into the electrolyte from the outside can be adequately inhibited. Accordingly, durability can be maintained even in the case the dye-sensitized solar cell 100 is placed in an environment subjected to large changes in temperature.

Here, although the melting point of the intermediate resin sealing portion 4*b* may be higher or lower than the melting point of the outer resin sealing portion 4*a*, the melting point of the intermediate resin sealing portion 4*b* is preferably lower than the melting point of the outer resin sealing portion 4*a*. In this case, since the melting point of the intermediate resin sealing portion 4*b* is lower than the melting point of the outer resin sealing portion 4*a*, the intermediate resin sealing portion 4*b* is softer than the outer resin sealing portion 4*a*. Consequently, in the case the dye-sensitized solar cell is placed in an environment subjected to large changes in temperature, even if stress acts on the interface between the outer resin sealing portion 4*a* and the intermediate resin sealing portion 4*b* in the first sealing portion 4A and the second sealing portion 4B, that stress is absorbed and adequately alleviated by the softer intermediate resin sealing portion 4*b*. Thus, decreases in sealability and adhesion between the outer resin sealing portion 4*a* and the intermediate resin sealing portion 4*b* can be adequately inhibited, and leakage of electrolyte or penetration of moisture into the electrolyte from the outside can be adequately inhibited. Accordingly, durability can be maintained even in the case the dye-sensitized solar cell 100 is placed in an environment subjected to large changes in temperature. In addition, in the case the melting point of the intermediate resin sealing portion 4$b$ is lower than the melting point of the outer resin sealing portion 4$a$, when adhering the first sealing portion 4A and the second sealing portion 4B in the sealing portion formation step, fluidity of the intermediate resin sealing portion 4$b$ is higher than that of the outer resin sealing portion 4$a$. Consequently, even if foreign substances such as contaminants adhere to the first sealing portion 4A or the second sealing portion 4B when adhering the first encapsulating portion 4A and the second encapsulating portion 4B, the first sealing portion 4A and the second sealing portion 4B are easily adhered with the intermediate resin sealing portion 4$b$ containing contaminants. Consequently, the first sealing portion 4A and the second sealing portion 4B can be securely adhered.

Here, although the intermediate resin sealing portion 4$b$ consist of only a single layer, the intermediate resin sealing portion 4$b$ may also be a laminate consisting of a plurality of intermediate resin sealing portions having different melting points. In this case, the intermediate resin sealing portion is laminated in a direction that connects the working electrode 1 and the counter electrode 2. Here, arranging the intermediate resin encapsulating portions so that the melting point of each layer of the intermediate resin encapsulating portion in the laminate decreases in order starting from the side of the counter electrode 2, for example, is preferable since stress at each interface between the intermediate resin sealing portions can be effectively reduced.

Moreover, although a dye-sensitized solar cell is described as an example of an electronic device of the present invention in the above-mentioned embodiments, the electronic device of the present invention is not limited to a dye-sensitized solar cell. It can also be applied to an EL display device, liquid crystal display device, organic thin film solar cell, secondary battery or scintillator panel. Furthermore, in the case of an EL display device, for example, the laminate that contains the electrodes and an EL layer is the sealed portion, while in a liquid crystal display device, the liquid crystal is the sealed portion.

EXAMPLES

Although the following provides a more detailed explanation of the contents of the present invention by listing examples thereof, the present invention is not limited to the following examples. Furthermore, in Tables 1 to 6, in the case in which it was difficult to measure MFR at 190° C., the approximate range of the MFR is indicated, and the MFR value measured at 210° C. was also shown. In addition, in Tables 1 to 12 Himilan, Nucrel, Bynel, 05L04, 05L05, Soarnol, Exceval and 31x-101 respectively refer to the products indicated below.

(1) Himilan

Ionomer manufactured by Du Pont-Mitsui Polychemicals Co., Ltd.

(2) Nucrel

Ethylene-methacrylic acid copolymer manufactured by Du Pont-Mitsui Polychemicals Co., Ltd.

(3) Bynel

Maleic anhydride-modified olefin in the form of maleic anhydride-modified polyethylene and maleic anhydride-modified polypropylene (4) 05L04

Acid-modified polyethylene manufactured by Tosoh Corp. (having a branched molecular structure in comparison with 05L05)

(5) 05L05

Acid-modified polyethylene manufactured by Tosoh Corp. (having a linear molecular structure in comparison with 05L04)

(6) Soarnol

Ethylene-vinyl alcohol copolymer manufactured by Nippon Synthetic Chemical Industry Co., Ltd.

(7) Exceval

Polyvinyl alcohol manufactured by Kuraray Co., Ltd.

(8) 31x-101

Ultraviolet curable resin manufactured by ThreeBond Co., Ltd.

Example 1

To begin with, an FTO substrate measuring 10 cm×10 cm×4 mm was prepared. Successively, after applying a titanium oxide paste (Ti Nanoixide T/sp, manufactured by Solaronix SA) onto the FTO substrate by doctor blade method to a thickness of 10 μm, the applied substrate was placed in a hot air circulation oven and baked for 3 hours at 150° C. to form a porous oxide semiconductor layer on the FTO substrate and obtain a working electrode measuring 5 cm×5 cm.

On the other hand, an FTO substrate was prepared in the same manner as that for the working electrode for use as a counter electrode substrate. A platinum catalyst film was formed on the counter electrode substrate by sputtering method to a thickness of 10 nm to obtain a counter electrode.

A working electrode and counter electrode were prepared in this manner.

Next, a resin sheet in the shape of a rectangular loop was prepared in which an opening measuring 5 cm×5 cm×100 μm was formed in the center of a sheet measuring 6 cm×6 cm×100 μm composed of an ionomer in the form of Himilan (melting point: 98° C.). This resin sheet was then arranged at an annular site surrounding the porous oxide semiconductor layer of the working electrode. This resin sheet was then melted by heating for 5 minutes at a melting temperature of 120° C. (hereinafter referred to as "melting temperature 1") to adhere the resin sheet to the annular site and fix an outer resin sealing portion to the annular site.

Successively, a resin sheet in the shape of a rectangular loop was prepared in which an opening measuring 5 cm×5 cm×100 μm was formed in the center of a sheet measuring 6 cm×6 cm×100 μm composed of an ethylene-methacrylic acid copolymer in the form of Nucrel (melting point: 97° C.).

This resin sheet in the shape of a rectangular loop composed of Nucrel was then affixed directly onto the resin sheet in the shape of a rectangular loop composed of Himilan at a melting temperature of 110° C. (hereinafter referred to as "melting temperature 2"). Thus, an intermediate resin sealing portion was formed on the outer resin sealing portion to form a first sealing portion.

Next, this working electrode was immersed overnight in an absolute ethanol solution which dissolved a photosensitizing dye in the form of N719 dye to a concentration of 0.2 mM to load the photosensitizing dye onto the working electrode.

On the other hand, a resin sheet in the shape of a rectangular loop was prepared in which an opening measuring 5 cm×5 cm×100 μm was formed in the center of a sheet measuring 6 cm×6 cm×100 μm composed of an ionomer in the form of Himilan. This resin sheet was then arranged at an annular site on the platinum catalyst film of the counter electrode. This resin sheet was then adhered to the annular site by melting by heating for 5 minutes at a melting temperature of 110° C. (hereinafter referred to as "melting temperature 3") to fix an outer resin sealing portion.

Successively, a resin sheet having the shape of a rectangular loop was prepared in which an opening measuring 5 cm×5 cm×100 μm was formed in the center of a sheet measuring 6 cm×6 cm×100 μm composed of an ethylene-methacrylic acid copolymer in the form of Nucrel.

This resin sheet in the shape of a rectangular loop composed of Nucrel was then affixed directly onto the resin sheet in the shape of a rectangular loop composed of Himilan at a melting temperature of 110° C. (hereinafter referred to as "melting temperature 4"). Thus, an intermediate resin sealing portion was formed on the outer resin sealing portion to form a second sealing portion.

Next, the working electrode provided with the first sealing portion was arranged so that the surface on the side of the porous oxide semiconductor layer of the FTO substrate was horizontal, and an electrolyte having as the main solvent thereof a volatile solvent composed of acetonitrile and containing lithium iodide at 0.05 M, lithium iodide at 0.1 M, 1,2-dimethyl-3-propylimidazolium iodide (DMPII) at 0.6 M and 4-tert-butylpyridine at 0.5 M (indicated with "A" in Tables 1 and 2) was injected to the inside of the first sealing portion to form an electrolyte layer.

Next, the counter electrode provided with the second sealing portion was arranged opposite the working electrode and placed under a reduced pressure environment of about 500 hPa to superimpose the first sealing portion and the second sealing portion. A brass frame of the same size as the sealing portions was heated under the reduced pressure environment, and the brass frame was arranged on the counter electrode on the opposite side from the second sealing portion followed by locally heating and melting the first sealing portion and the second sealing portion at a temperature of 160° C. (hereinafter referred to as the "sealing temperature") while applying pressure of 5 MPa using a pressing machine to form a sealing portion and obtain a laminate. Subsequently, the laminate was removed under atmospheric pressure. A dye-sensitized solar cell was obtained in this manner.

Examples 2 to 14

Dye-sensitized solar cells were prepared in the same manner as Example 1 with the exception of changing the resins, and the MFR thereof, that compose the outer resin sealing portion and the intermediate resin sealing portion of the first sealing portion, the resins, and the MFR thereof, that compose the outer resin sealing portion and the intermediate resin sealing portion of the second sealing portion, the melting temperatures 1 to 4 and the sealing temperature as shown in Table 1.

Examples 15 to 20

Dye-sensitized solar cells were prepared in the same manner as Example 1 with the exception of changing the resins, and the MFR thereof, that compose the outer resin sealing portion and intermediate resin sealing portion of the first sealing portion, the resins, and the MFR thereof, that compose the outer resin sealing portion and the intermediate resin sealing portion of the second sealing portion, the melting temperatures 1 to 4 and the sealing temperature as shown in Tables 1 and 2.

Furthermore, the 31x-101 used for the outer resin sealing portions of the first sealing portion and the second sealing portion is an ultraviolet curable resin, and when adhering this ultraviolet curable resin to the annular sites of the working electrode and counter electrode, the ultraviolet curable resin was adhered to the annular sites by applying onto the annular sites followed by curing the ultraviolet curable resin by irradiating with ultraviolet light (UV) in a low oxygen environment. Consequently, "–" marks are indicated for the melting temperatures 1 and 3 in Tables 1 and 2.

Examples 21 to 26

Dye-sensitized solar cells were prepared in the same manner as Example 1 with the exception of changing the resins, and the MFR thereof, that compose the outer resin sealing portion and the intermediate resin sealing portion of the first sealing portion, the resins, and the MFR thereof, that compose the outer resin sealing portion and the intermediate resin sealing portion of the second sealing portion, the melting temperatures 1 to 4 and the sealing temperature as shown in Table 2.

Comparative Examples 1 to 5

Dye-sensitized solar cells were prepared in the same manner as Example 1 with the exception of changing the resins, and the MFR thereof, that compose the outer resin sealing portion and the intermediate resin sealing portion of the first sealing portion, the resins, and the MFR thereof, that compose the outer resin sealing portion and the intermediate resin sealing portion of the second sealing portion, the melting temperatures 1 to 4 and the sealing temperature as shown in Table 2.

Comparative Example 6

A working electrode was prepared and loaded with a dye in the same manner as Example 1. On the other hand, a counter electrode was prepared in the same manner as Example 1. A precursor of an ultraviolet cured resin in the form of 31x-101 was applied onto an annular site of the working electrode and cured by irradiating with ultraviolet light to obtain an annular first sealing portion (outer resin sealing portion). Successively, an electrolyte was arranged on the inside of the first sealing portion in the same manner as Example 1. On the other hand, the 31x-101 was applied onto an annular site of the counter electrode, and after opposing the working electrode and the counter electrode so that the 31x-101 superimposed the first sealing portion, the 31x-101 was irradiated with ultraviolet light to form the second sealing portion (outer resin sealing portion). A dye-sensitized solar cell was prepared in this manner.

Examples 27 to 52 and Comparative Examples 7 to 12

Dye-sensitized solar cells were prepared in the same manner as Examples 1 to 26 and Comparative Examples 1 to 6, respectively, with the exception of changing the electrolyte to a volatile electrolyte having as the main solvent thereof a volatile solvent composed of methoxypropionitrile and containing lithium iodide at 0.1 M, iodine at 0.05 M and 4-tert-butylpyridine at 0.5M (indicated with "B" in Tables 3 and 4) as shown in Tables 3 and 4.

Examples 53 to 78 and Comparative Examples 13 to 18

Dye-sensitized solar cells were prepared in the same manner as Examples 1 to 26 and Comparative Examples 1 to 6, respectively, with the exception of changing the electrolyte to a gelled electrolyte that was gelled by adding 5% of silica fine particles having a mean particle diameter of 15 nm to a solution obtained by adding lithium iodide at 0.1 M, iodine at 0.05 M and 4-tert-butylpyridine at 0.5 M to a volatile solvent composed of methoxypropionitrile based on the total weight of the solution (referred to as "C" in Tables 5 and 6) as shown in Tables 5 and 6.

Example 79

A dye-sensitized solar cell was prepared in the same manner as Example 1 with the exception of changing the resins, and the MFR thereof, that compose the outer resin sealing portion and the intermediate resin sealing portion of the first sealing portion, the resins, and the MFR thereof, that compose the outer resin sealing portion and the intermediate resin sealing portion of the second sealing portion, the melting temperatures 1 to 4 and the sealing temperature as shown in Table 6.

Example 80

To begin with, an FTO substrate measuring 10 cm×10 cm×4 mm was prepared. Successively, after applying a titanium oxide paste (Ti Nanoixide T/sp, manufactured by Solaronix SA) onto the FTO substrate by doctor blade method to a thickness of 10 μm, the applied substrate was placed in a hot air circulation oven and baked for 3 hours at 150° C. to form a porous oxide semiconductor layer on the FTO substrate and obtain a working electrode measuring 5 cm×5 cm.

On the other hand, an FTO substrate was prepared in the same manner as that for the working electrode for use as a counter electrode substrate. A platinum catalyst film was formed on the counter electrode substrate by sputtering method to a thickness of 10 nm to obtain a counter electrode.

A working electrode and counter electrode were prepared in this manner.

Next, a resin sheet in the shape of a rectangular loop was prepared in which an opening measuring 5 cm×5 cm×100 μm was formed in the center of a sheet measuring 6 cm×6 cm×100 μm composed of an ionomer in the form of Himilan (melting point: 98° C.). This resin sheet was arranged at an annular site surrounding the porous oxide semiconductor layer of the working electrode. This resin sheet was then melted by heating for 5 minutes at a melting temperature of 120° C. (melting temperature 1) to adhere the resin sheet to the annular site and fix an outer resin sealing portion to the annular site.

Successively, a resin sheet in the shape of a rectangular loop was prepared in which an opening measuring 5 cm×5 cm×100 μm was formed in the center of a sheet measuring 6 cm×6 cm×100 μm composed of an ethylene-methacrylic acid copolymer in the form of Nucrel (melting point: 97° C.).

This resin sheet in the shape of a rectangular loop composed of Nucrel was then affixed directly onto the resin sheet in the shape of a rectangular loop composed of Himilan at a melting temperature of 110° C. (melting temperature 2). Thus, an intermediate resin sealing portion was formed on the outer resin sealing portion to form a first sealing portion.

Next, the working electrode was immersed overnight in an absolute ethanol solution which dissolved a photosensitizing dye in the form of N719 dye to a concentration of 0.2 mM to load the photosensitizing dye onto the working electrode.

On the other hand, a resin sheet in the shape of a rectangular loop was prepared in which an opening measuring 5 cm×5 cm×100 μm was formed in the center of a sheet measuring 6 cm×6 cm×100 μm composed of an ionomer in the form of Himilan. This resin sheet was then arranged at an annular site on the platinum catalyst film of the counter electrode. This resin sheet was then adhered to the annular site by melting by heating for 5 minutes at a melting temperature of 110° C. (melting temperature 3) to fix an outer resin sealing portion.

Successively, a resin sheet having the shape of a rectangular loop was prepared in which an opening measuring 5 cm×5 cm×100 μm was formed in the center of a sheet measuring 6 cm×6 cm×100 μm composed of an ethylene-methacrylic acid copolymer in the form of Nucrel.

This resin sheet in the shape of a rectangular loop composed of Nucrel was then affixed directly onto the resin sheet in the shape of a rectangular loop composed of Himilan at a melting temperature of 110° C. (melting temperature 4). Thus, an intermediate resin sealing portion was formed on the outer resin sealing portion to form a second sealing portion.

Next, the working electrode provided with the first sealing portion was arranged so that the surface on the side of the porous oxide semiconductor layer of the FTO substrate was horizontal, and an electrolyte having as the main solvent thereof a volatile solvent composed of acetonitrile and containing lithium iodide at 0.05 M, lithium iodide at 0.1 M, 1,2-dimethyl-3-propylimidazolium iodide (DMPII) at 0.6 M and 4-tert-butylpyridine at 0.5 M (indicated with "A" in Tables 7 and 8) was injected to the inside of the first sealing portion to form an electrolyte layer.

Next, the counter electrode provided with the second sealing portion was arranged face-to-face to the working electrode and placed under a reduced pressure environment of about 500 hPa to superimpose the first sealing portion and the second sealing portion. A brass frame of the same size as the sealing portions was heated under the reduced pressure environment, and the brass frame was arranged on the counter electrode on the opposite side from the second sealing portion followed by locally heating and melting the first sealing portion and the second sealing portion at a temperature of 160° C. (hereinafter referred to as "sealing temperature") while applying pressure of 5 MPa using a pressing machine to form a sealing portion and obtain a laminate. Subsequently, the laminate was removed under atmospheric pressure. A dye-sensitized solar cell was obtained in this manner.

Examples 81 to 93

Dye-sensitized solar cells were prepared in the same manner as Example 80 with the exception of changing the resins, and the melting points thereof, that compose the outer resin sealing portion and the intermediate resin sealing portion of the first sealing portion, the resins, and the melting points thereof, that compose the outer resin sealing portion and the intermediate resin sealing portion of the second sealing portion, the melting temperatures 1 to 4 and the sealing temperature as shown in Table 7.

Examples 94 to 99

Dye-sensitized solar cells were prepared in the same manner as Example 80 with the exception of changing the resins, and the melting points thereof, that compose the outer resin sealing portion and the intermediate resin sealing portion of the first sealing portion, the resins, and the melting points thereof, that compose the outer resin sealing portion and the intermediate resin sealing portion of the second sealing portion, the melting temperatures 1 to 4 and the sealing temperature as shown in Tables 7 and 8.

Furthermore, 31x-101 used for the outer resin sealing portions of the first sealing portion and the second sealing portion is an ultraviolet curable resin, and when adhering this ultraviolet curable resin to the annular sites of the working electrode and counter electrode, the ultraviolet curable resin was adhered to the annular sites by applying onto the annular sites followed by curing the ultraviolet curable resin by irradiating with ultraviolet light (UV) in a low oxygen environment. Consequently, "–" marks are indicated for the melting temperatures 1 and 3 in Tables 7 and 8.

Examples 100 to 104

Dye-sensitized solar cells were prepared in the same manner as Example 80 with the exception of changing the resins, and the melting points thereof, that compose the outer resin sealing portion and the intermediate resin sealing portion of the first sealing portion, the resins, and the melting points thereof, that compose the outer resin sealing portion and the intermediate resin sealing portion of the second sealing portion, the melting temperatures 1 to 4 and the sealing temperature as shown in Table 8.

Comparative Examples 19 to 23

Dye-sensitized solar cells were prepared in the same manner as Example 80 with the exception of changing the resins, and the melting points thereof, that compose the outer resin sealing portion and the intermediate resin sealing portion of the first sealing portion, the resins, and the melting points thereof, that compose the outer resin sealing portion and the intermediate resin sealing portion of the second sealing portion, the melting temperatures 1 to 4 and the sealing temperature as shown in Table 7.

Comparative Example 24

To begin with, a working electrode was prepared and loaded with a dye in the same manner as Example 80. On the other hand, a counter electrode was prepared in the same manner as Example 80. A precursor of an ultraviolet cured resin in the form of 31x-101 was applied onto an annular site of the working electrode and cured by irradiating with ultraviolet light to obtain an annular first sealing portion (outer resin sealing portion). Successively, an electrolyte was arranged on the inside of the first sealing portion in the same manner as Example 80. On the other hand, the 31x-101 was applied onto an annular site of the counter electrode, and after opposing the working electrode and the counter electrode so that the 31x-101 superimposed the first sealing portion, the 31x-101 was irradiated with ultraviolet light to form the second sealing portion (outer resin sealing portion). A dye-sensitized solar cell was prepared in this manner.

Examples 105 to 129 and Comparative Examples 25 to 30

Dye-sensitized solar cells were prepared in the same manner as Examples 80 to 104 and Comparative Examples 19 to 24, respectively, with the exception of changing the electrolyte to a volatile electrolyte having as the main solvent thereof a volatile solvent composed of methoxypropionitrile and containing lithium iodide at 0.1M, iodine at 0.05 M and 4-tert-butylpyridine at 0.5 M (indicated with "B" in Tables 9 and 10) as shown in Tables 9 and 10.

Examples 130 to 154 and Comparative Examples 31 to 36

Dye-sensitized solar cells were prepared in the same manner as Examples 80 to 104 and Comparative Examples 19 to 24, respectively, with the exception of changing the electrolyte to a gelled electrolyte that was gelled by adding 5% of silica fine particles having a mean particle diameter of 15 nm to a solution obtained by adding lithium iodide at 0.1 M, iodine at 0.05 M and 4-tert-butylpyridine at 0.5 M to a volatile solvent composed of methoxypropionitrile based on the total weight of the solution (referred to as "C" in Tables 11 and 12) as shown in Tables 11 and 12.

Example 155

Dye-sensitized solar cells were prepared in the same manner as Example 80 with the exception of changing the resins, and the melting points thereof, that compose the outer resin sealing portion and the intermediate resin sealing portion of the first sealing portion, the resins, and the melting points thereof, that compose the outer resin sealing portion and the intermediate resin sealing portion of the second sealing portion, the melting temperatures 1 to 4 and the sealing temperature as shown in Table 12.

[Characteristic Evaluation]

The characteristics of the dye-sensitized solar cells of Examples 1 to 155 and Comparative Examples 1 to 36 were evaluated by carrying out durability testing in the manner described below. Namely, durability testing was carried out on the dye-sensitized solar cells of Examples 1 to 155 and Comparative Examples 1 to 36 in accordance with JIS C8917 by carrying out 200 cycles of thermal cycling consisting of lowering the ambient temperature to −40° C. followed by raising to 90° C. per cycle. The maintenance rate of photoelectric conversion efficiency was then calculated according to the equation indicated below.

Maintenance rate of photoelectric conversion efficiency (%)=Photoelectric conversion efficiency after durability testing/photoelectric conversion efficiency before durability testing×100 [Equation 1]

Furthermore, maintenance rate of photoelectric conversion efficiency in excess of 100% means that the conversion efficiency after durability testing is higher than the initial conversion efficiency. The results are shown in Tables 1 to 12.

TABLE 1

| | First sealing portion | | | | | | Second sealing portion | | | | | | | | |
|---|---|---|---|---|---|---|---|---|---|---|---|---|---|---|---|
| | Outer resin sealing portion | | Melt. temp. 1 | Intermediate resin sealing portion | | Melt. temp. 2 | Outer resin sealing portion | | Melt. temp. 3 | Intermediate resin sealing portion | | Melt. temp. 4 | Sealing temp. | | Characteristics evaluation |
| | Resin | MFR (g/10 min) | (° C.) | Resin | MFR (g/10 min) | (° C.) | Resin | MFR (g/10 min) | (° C.) | Resin | MFR (g/10 min) | (° C.) | (° C.) | Electrolyte | |
| Ex. 1 | Himilan 1652 | 5.5 | 120 | Nucrel N1108C | 8.0 | 110 | Himilan 1652 | 5.5 | 120 | Nucrel N1108C | 8.0 | 110 | 160 | A | 90 |

TABLE 1-continued

| | First sealing portion | | | | | | Second sealing portion | | | | | | | | |
|---|---|---|---|---|---|---|---|---|---|---|---|---|---|---|---|
| | Outer resin sealing portion | | | Intermediate resin sealing portion | | | Outer resin sealing portion | | | Intermediate resin sealing portion | | | | | |
| | Resin | MFR (g/10 min) | Melt. temp. 1 (° C.) | Resin | MFR (g/10 min) | Melt. temp. 2 (° C.) | Resin | MFR (g/10 min) | Melt. temp. 3 (° C.) | Resin | MFR (g/10 min) | Melt. temp. 4 (° C.) | Sealing temp. (° C.) | Electrolyte | Characteristics evaluation |
| Ex. 2 | Himilan 1652 | 5.5 | 120 | Himilan 1702 | 16 | 110 | Himilan 1652 | 5.5 | 120 | Himilan 1702 | 16 | 110 | 160 | A | 85 |
| Ex. 3 | Himilan 1652 | 5.5 | 120 | Nucrel N1050H | 500 | 110 | Himilan 1652 | 5.5 | 120 | Nucrel N1050H | 500 | 110 | 160 | A | 70 |
| Ex. 4 | Bynel 4164 | 1.2 | 160 | Nucrel N1108C | 8.0 | 110 | Bynel 4164 | 1.2 | 160 | Nucrel N1108C | 8.0 | 110 | 160 | A | 100 |
| Ex. 5 | Himilan 1652 | 5.5 | 120 | Bynel 42E703 | 6.4 | 130 | Himilan 1652 | 5.5 | 120 | Bynel 42E703 | 6.4 | 130 | 160 | A | 70 |
| Ex. 6 | Bynel 50E806 | ≤10 (25@210° C.) | 190 | Himilan 1702 | 16 | 110 | Bynel 50E806 | ≤10 (25@210° C.) | 190 | Himilan 1702 | 16 | 110 | 160 | A | 85 |
| Ex. 7 | Bynel 50E725 | ≤1 (3@210° C.) | 190 | Himilan 1652 | 5.5 | 110 | Bynel 50E725 | ≤1 (3@210° C.) | 190 | Himilan 1652 | 5.5 | 110 | 160 | A | 75 |
| Ex. 8 | Bynel 50E806 | ≤1 (6@210° C.) | 190 | Himilan 1652 | 5.5 | 110 | Bynel 50E806 | ≤1 (6@210° C.) | 190 | Himilan 1652 | 5.5 | 110 | 160 | A | 75 |
| Ex. 9 | Bynel 4140 | 1.5 | 160 | Nucrel N1108C | 8.0 | 110 | Bynel 4140 | 1.5 | 160 | Nucrel N1108C | 8.0 | 110 | 160 | A | 90 |
| Ex. 10 | Bynel 41E710 | 2.7 | 160 | Nucrel N1525 | 25 | 110 | Bynel 41E710 | 2.7 | 160 | Nucrel N1108C | 8.0 | 110 | 160 | A | 90 |
| Ex. 11 | Bynel 41E871 | 1.8 | 160 | Nucrel N1108C | 8.0 | 110 | Bynel 41E871 | 1.8 | 160 | Himilan 1702 | 16 | 110 | 160 | A | 85 |
| Ex. 12 | Bynel 4125 | 2.5 | 160 | Himilan 1702 | 16 | 110 | Bynel 1652 | 5.5 | 120 | Himilan 1702 | 16 | 110 | 160 | A | 85 |
| Ex. 13 | Bynel 4157N | 3.0 | 160 | Himilan 1702 | 16 | 110 | Bynel 4164 | 1.2 | 160 | Himilan 1652 | 5.5 | 110 | 160 | A | 75 |
| Ex. 14 | Bynel 41E762 | 2.5 | 160 | Himilan 1652 | 5.5 | 110 | Bynel 42E703 | 6.4 | 120 | Nucrel N1108C | 8.0 | 110 | 210 | A | 90 |
| Ex. 15 | 31x-101 | 0.0 | — | Himilan 1652 | 5.5 | 110 | 31x-101 | 0.0 | — | Nucrel N1050H | 500 | 110 | 160 | A | 65 |
| Ex. 16 | 31x-101 | 0.0 | — | Himilan 1702 | 16 | 110 | 31x-101 | 0.0 | — | Nucrel N1108C | 8.0 | 110 | 160 | A | 85 |

TABLE 2

| | First sealing portion | | | | | | Second sealing portion | | | | | | | | |
|---|---|---|---|---|---|---|---|---|---|---|---|---|---|---|---|
| | Outer resin sealing portion | | | Intermediate resin sealing portion | | | Outer resin sealing portion | | | Intermediate resin sealing portion | | | | | |
| | Resin | MFR (g/10 min) | Melt. temp. 1 (° C.) | Resin | MFR (g/10 min) | Melt. temp. 2 (° C.) | Resin | MFR (g/10 min) | Melt. temp. 3 (° C.) | Resin | MFR (g/10 min) | Melt. temp. 4 (° C.) | Sealing temp. (° C.) | Electrolyte | Characteristics evaluation |
| Ex. 17 | 31x-101 | 0.0 | — | Nucrel N1050H | 500 | 110 | 31x-101 | 0.0 | — | Himilan 1702 | 16 | 110 | 160 | A | 80 |
| Ex. 18 | 31x-101 | 0.0 | — | Nucrel N1525 | 25 | 110 | 31x-101 | 0.0 | — | Himilan 1702 | 16 | 110 | 160 | A | 80 |
| Ex. 19 | 31x-101 | 0.0 | — | 05L04 | 8.0 | 120 | 31x-101 | 0.0 | — | Himilan 1652 | 5.5 | 110 | 160 | A | 70 |
| Ex. 20 | 31x-101 | 0.0 | — | 05L05 | 9.0 | 135 | 31x-101 | 0.0 | — | Nucrel N1108C | 8.0 | 110 | 160 | A | 85 |
| Ex. 21 | Himilan 1652 | 5.5 | 120 | — | — | — | Himilan 1652 | 5.5 | 120 | Nucrel N1108C | 8.0 | 110 | 160 | A | 75 |
| Ex. 22 | Himilan 1652 | 5.5 | 120 | — | — | — | Himilan 1652 | 5.5 | 120 | Himilan 1702 | 16 | 110 | 160 | A | 75 |
| Ex. 23 | Himilan 1652 | 5.5 | 120 | Nucrel N1050H | 500 | 110 | Himilan 1652 | 5.5 | 120 | — | — | — | 160 | A | 75 |
| Ex. 24 | Bynel 4164 | 1.2 | 160 | Nucrel N1108C | 8.0 | 110 | Bynel 4164 | 1.2 | 160 | — | — | — | 160 | A | 75 |
| Ex. 25 | Soarnol A4412 | ≤7 (12@210° C.) | 230 | Nucrel N1108C | 8.0 | 110 | Soarnol A4412 | ≤7 (12@210° C.) | 230 | Nucrel N1108C | 8.0 | 110 | 160 | A | 80 |
| Ex. 26 | Exceval RS2117 | ≤7 | 230 | Nucrel N1108C | 8.0 | 110 | Exceval RS2117 | ≤7 | 230 | Nucrel N1108C | 8.0 | 110 | 160 | A | 80 |

TABLE 2-continued

| | First sealing portion | | | | | | Second sealing portion | | | | | | | | |
|---|---|---|---|---|---|---|---|---|---|---|---|---|---|---|---|
| | Outer resin sealing portion | | Melt. | Intermediate resin sealing portion | | Melt. | Outer resin sealing portion | | Melt. | Intermediate resin sealing portion | | Melt. | Seal- | | Charac- |
| | Resin | MFR (g/10 min) | temp. 1 (° C.) | Resin | MFR (g/10 min) | temp. 2 (° C.) | Resin | MFR (g/10 min) | temp. 3 (° C.) | Resin | MFR (g/10 min) | temp. 4 (° C.) | ing temp. (° C.) | Electro-lyte | teristics evalu-ation |
| Comp. Ex. 1 | Himilan 1652 | 5.5 | 120 | — | — | — | Himilan 1652 | 5.5 | 120 | — | — | — | 160 | A | 30 |
| Comp. Ex. 2 | Nucrel N1108C | 8.0 | 110 | — | — | — | Bynel 42E703 | 6.4 | 120 | — | — | — | 160 | A | 30 |
| Comp. Ex. 3 | Nucrel N1050H | 500 | 110 | — | — | — | Nucrel N1050H | 500 | 110 | — | — | — | 160 | A | 10 |
| Comp. Ex. 4 | Himilan 1652 | 5.5 | 120 | — | — | — | Bynel 4164 | 1.2 | 120 | — | — | — | 160 | A | 30 |
| Comp. Ex. 5 | Bynel 4164 | 1.2 | 160 | — | — | — | Bynel 4164 | 1.2 | 160 | — | — | — | 210 | A | 30 |
| Comp. Ex. 6 | 31x-101 | 0.0 | — | — | — | — | 31x-101 | 0.0 | — | — | — | — | — | A | 20 |

TABLE 3

| | First sealing portion | | | | | | Second sealing portion | | | | | | | | |
|---|---|---|---|---|---|---|---|---|---|---|---|---|---|---|---|
| | Outer resin sealing portion | | Melt. | Intermediate resin sealing portion | | Melt. | Outer resin sealing portion | | Melt. | Intermediate resin sealing portion | | Melt. | Seal- | | Charac- |
| | Resin | MFR (g/10 min) | temp. 1 (° C.) | Resin | MFR (g/10 min) | temp. 2 (° C.) | Resin | MFR (g/10 min) | temp. 3 (° C.) | Resin | MFR (g/10 min) | temp. 4 (° C.) | ing temp. (° C.) | Electro-lyte | teristics evalu-ation |
| Ex. 27 | Himilan 1652 | 5.5 | 120 | Nucrel N1108C | 8.0 | 110 | Himilan 1652 | 5.5 | 120 | Nucrel N1108C | 8.0 | 110 | 160 | B | 110 |
| Ex. 28 | Himilan 1652 | 5.5 | 120 | Himilan 1702 | 16 | 110 | Himilan 1652 | 5.5 | 120 | Himilan 1702 | 16 | 110 | 160 | B | 105 |
| Ex. 29 | Himilan 1652 | 5.5 | 120 | Nucrel N1050H | 500 | 110 | Himilan 1652 | 5.5 | 120 | Nucrel N1050H | 500 | 110 | 160 | B | 90 |
| Ex. 30 | Bynel 4164 | 1.2 | 160 | Nucrel N1108C | 8.0 | 110 | Bynel 4164 | 1.2 | 160 | Nucrel N1108C | 8.0 | 110 | 160 | B | 110 |
| Ex. 31 | Himilan 1652 | 5.5 | 120 | Bynel 42E703 | 6.4 | 130 | Himilan 1652 | 5.5 | 120 | Bynel 42E703 | 6.4 | 130 | 160 | B | 90 |
| Ex. 32 | Bynel 50E806 | ≤10 (25@210° C.) | 190 | Himilan 1702 | 16 | 110 | Bynel 50E806 | ≤10 (25@210° C.) | 190 | Himilan 1702 | 16 | 110 | 160 | B | 105 |
| Ex. 33 | Bynel 50E725 | ≤1 (3@210° C.) | 190 | Himilan 1652 | 5.5 | 110 | Bynel 50E725 | ≤1 (3@210° C.) | 190 | Himilan 1652 | 5.5 | 110 | 160 | B | 95 |
| Ex. 34 | Bynel 50E806 | ≤1 (6@210° C.) | 190 | Himilan 1652 | 5.5 | 110 | Bynel 50E806 | ≤1 (6@210° C.) | 190 | Himilan 1652 | 5.5 | 110 | 160 | B | 95 |
| Ex. 35 | Bynel 4140 | 1.5 | 160 | Nucrel N1108C | 8.0 | 110 | Bynel 4140 | 1.5 | 160 | Nucrel N1108C | 8.0 | 110 | 160 | B | 110 |
| Ex. 36 | Bynel 41E710 | 2.7 | 160 | Nucrel N1525 | 25 | 110 | Bynel 41E710 | 2.7 | 160 | Nucrel N1108C | 8.0 | 110 | 160 | B | 110 |
| Ex. 37 | Bynel 41E871 | 1.8 | 160 | Nucrel N1108C | 3.0 | 110 | Bynel 41E871 | 1.8 | 160 | Himilan 1702 | 16 | 110 | 160 | B | 105 |
| Ex. 38 | Bynel 4125 | 2.5 | 160 | Himilan 1702 | 16 | 110 | Himilan 1652 | 5.5 | 120 | Himilan 1702 | 16 | 110 | 160 | B | 105 |
| Ex. 39 | Bynel 4157N | 3.0 | 160 | Himilan 1702 | 16 | 110 | Bynel 4164 | 1.2 | 160 | Himilan 1652 | 5.5 | 110 | 160 | B | 95 |
| Ex. 40 | Bynel 41E762 | 2.5 | 160 | Himilan 1652 | 5.5 | 110 | Bynel 42E703 | 6.4 | 120 | Nucrel N1108C | 8.0 | 110 | 210 | B | 110 |
| Ex. 41 | 31x-101 | 0.0 | — | Himilan 1652 | 5.5 | 110 | 31x-101 | 0.0 | — | Nucrel N1050H | 500 | 110 | 160 | B | 90 |
| Ex. 42 | 31x-101 | 0.0 | — | Himilan 1702 | 16 | 110 | 31x-101 | 0.0 | — | Nucrel N1108C | 8.0 | 110 | 160 | B | 110 |

TABLE 4

| | First sealing portion | | | | | | Second sealing portion | | | | | | | | |
|---|---|---|---|---|---|---|---|---|---|---|---|---|---|---|---|
| | Outer resin sealing portion | | Melt. temp. 1 (° C.) | Intermediate resin sealing portion | | Melt. temp. 2 (° C.) | Outer resin sealing portion | | Melt. temp. 3 (° C.) | Intermediate resin sealing portion | | Melt. temp. 4 (° C.) | Sealing temp. (° C.) | Electrolyte | Characteristics evaluation |
| | Resin | MFR (g/10 min) | | Resin | MFR (g/10 min) | | Resin | MFR (g/10 min) | | Resin | MFR (g/10 min) | | | | |
| Ex. 43 | 31x-101 | 0.0 | — | Nucrel N1050H | 500 | 110 | 31x-101 | 0.0 | — | Himilan 1702 | 16 | 110 | 160 | B | 105 |
| Ex. 44 | 31x-101 | 0.0 | — | Nucrel N1525 | 25 | 110 | 31x-101 | 0.0 | — | Himilan 1702 | 16 | 110 | 160 | B | 105 |
| Ex. 45 | 31x-101 | 0.0 | — | 05L04 | 8.0 | 120 | 31x-101 | 0.0 | — | Himilan 1652 | 5.5 | 110 | 160 | B | 95 |
| Ex. 46 | 31x-101 | 0.0 | — | 05L05 | 9.0 | 135 | 31x-101 | 0.0 | — | Nucrel N1108C | 8.0 | 110 | 160 | B | 110 |
| Ex. 47 | Himilan 1652 | 5.5 | 120 | — | — | — | Himilan 1652 | 5.5 | 120 | Nucrel N1108C | 8.0 | 110 | 160 | B | 85 |
| Ex. 48 | Himilan 1652 | 5.5 | 120 | — | — | — | Himilan 1652 | 5.5 | 120 | Himilan 1702 | 16 | 110 | 160 | B | 85 |
| Ex. 49 | Himilan 1652 | 5.5 | 120 | Nucrel N1050H | 500 | 110 | Himilan 1652 | 5.5 | 120 | — | — | — | 160 | B | 85 |
| Ex. 50 | Bynel 4164 | 1.2 | 160 | Nucrel N1108C | 8.0 | 110 | Bynel 4164 | 1.2 | 160 | — | — | — | 160 | B | 85 |
| Ex. 51 | Soarnol A4412 | ≤7 (12@210° C.) | 230 | Nucrel N1108C | 8.0 | 110 | Soarnol A4412 | ≤7 (12@210° C.) | 230 | Nucrel N1108C | 8.0 | 110 | 160 | B | 90 |
| Ex. 52 | Exceval RS2117 | ≤7 | 230 | Nucrel N1108C | 8.0 | 110 | Exceval RS2117 | ≤7 | 230 | Nucrel N1108C | 8.0 | 110 | 160 | B | 90 |
| Comp. Ex. 7 | Himilan 1652 | 5.5 | 120 | — | — | — | Himilan 1652 | 5.5 | 120 | — | — | — | 160 | B | 40 |
| Comp. Ex. 8 | Nucrel N1108C | 8.0 | 110 | — | — | — | Bynel 42E703 | 6.4 | 120 | — | — | — | 160 | B | 40 |
| Comp. Ex. 9 | Nucrel N1050H | 500 | 110 | — | — | — | Nucrel N1050H | 500 | 110 | — | — | — | 160 | B | 20 |
| Comp. Ex. 10 | Himilan 1652 | 5.5 | 120 | — | — | — | Bynel 4164 | 1.2 | 120 | — | — | — | 160 | B | 40 |
| Comp. Ex. 11 | Bynel 4164 | 1.2 | 160 | — | — | — | Bynel 4164 | 1.2 | 160 | — | — | — | 210 | B | 40 |
| Comp. Ex. 12 | 31x-101 | 0.0 | — | — | — | — | 31x-101 | 0.0 | — | — | — | — | — | B | 30 |

TABLE 5

| | First sealing portion | | | | | | Second sealing portion | | | | | | | | |
|---|---|---|---|---|---|---|---|---|---|---|---|---|---|---|---|
| | Outer resin sealing portion | | Melt. temp. 1 (° C.) | Intermediate resin sealing portion | | Melt. temp. 2 (° C.) | Outer resin sealing portion | | Melt. temp. 3 (° C.) | Intermediate resin sealing portion | | Melt. temp. 4 (° C.) | Sealing temp. (° C.) | Electrolyte | Characteristics evaluation |
| | Resin | MFR (g/10 min) | | Resin | MFR (g/10 min) | | Resin | MFR (g/10 min) | | Resin | MFR (g/10 min) | | | | |
| Ex. 53 | Himilan 1652 | 5.5 | 120 | Nucrel N1108C | 8.0 | 110 | Himilan 1652 | 5.5 | 120 | Nucrel N1108C | 8.0 | 110 | 160 | C | 110 |
| Ex. 54 | Himilan 1652 | 5.5 | 120 | Himilan 1702 | 16 | 110 | Himilan 1652 | 5.5 | 120 | Himilan 1702 | 16 | 110 | 160 | C | 105 |
| Ex. 55 | Himilan 1652 | 5.5 | 120 | Nucrel N1050H | 500 | 110 | Himilan 1652 | 5.5 | 120 | Nucrel N1050H | 500 | 110 | 160 | C | 95 |
| Ex. 56 | Bynel 4164 | 1.2 | 160 | Nucrel N1108C | 8.0 | 110 | Bynel 4164 | 1.2 | 160 | Nucrel N1108C | 8.0 | 110 | 160 | C | 110 |
| Ex. 57 | Himilan 1652 | 5.5 | 120 | Bynel 42E703 | 6.4 | 130 | Himilan 1652 | 5.5 | 120 | Bynel 42E703 | 6.4 | 130 | 160 | C | 85 |
| Ex. 58 | Bynel 50E806 | ≤10 (25@210° C.) | 190 | Himilan 1702 | 16 | 110 | Bynel 50E806 | ≤10 (25@210° C.) | 190 | Himilan 1702 | 16 | 110 | 160 | C | 105 |
| Ex. 59 | Bynel 50E725 | ≤1 (3@210° C.) | 190 | Himilan 1652 | 5.5 | 110 | Bynel 50E725 | ≤1 (3@210° C.) | 190 | Himilan 1652 | 5.5 | 110 | 160 | C | 85 |
| Ex. 60 | Bynel 50E806 | ≤1 (6@210° C.) | 190 | Himilan 1652 | 5.5 | 110 | Bynel 50E806 | ≤1 (6@210° C.) | 190 | Himilan 1652 | 5.5 | 110 | 160 | C | 85 |
| Ex. 61 | Bynel 4140 | 1.5 | 160 | Nucrel N1108C | 8.0 | 110 | Bynel 4140 | 1.5 | 160 | Nucrel N1108C | 8.0 | 110 | 160 | C | 110 |

TABLE 5-continued

| | First sealing portion | | | | | | Second sealing portion | | | | | | | | |
|---|---|---|---|---|---|---|---|---|---|---|---|---|---|---|---|
| | Outer resin sealing portion | | Melt. | Intermediate resin sealing portion | | Melt. | Outer resin sealing portion | | Melt. | Intermediate resin sealing portion | | Melt. | Seal- | | Charac- |
| | Resin | MFR (g/10 min) | temp. 1 (° C.) | Resin | MFR (g/10 min) | temp. 2 (° C.) | Resin | MFR (g/10 min) | temp. 3 (° C.) | Resin | MFR (g/10 min) | temp. 4 (° C.) | ing temp. (° C.) | Electro- lyte | teristics evalu- ation |
| Ex. 62 | Bynel 41E710 | 2.7 | 160 | Nucrel N1525 | 25 | 110 | Bynel 41E710 | 2.7 | 160 | Nucrel N1108C | 8.0 | 110 | 160 | C | 110 |
| Ex. 63 | Bynel 41E871 | 1.8 | 160 | Nucrel N1108C | 8.0 | 110 | Bynel 41E871 | 1.8 | 160 | Himilan 1702 | 16 | 110 | 160 | C | 105 |
| Ex. 64 | Bynel 4125 | 2.5 | 160 | Himilan 1702 | 16 | 110 | Himilan 1652 | 5.5 | 120 | Himilan 1702 | 16 | 110 | 160 | C | 105 |
| Ex. 65 | Bynel 4157H | 3.0 | 160 | Himilan 1702 | 16 | 110 | Bynel 4164 | 1.2 | 160 | Himilan 1652 | 5.5 | 110 | 160 | C | 100 |
| Ex. 66 | Bynel 41E762 | 2.5 | 160 | Himilan 1652 | 5.5 | 110 | Bynel 42E703 | 6.4 | 120 | Nucrel N1108C | 8.0 | 110 | 210 | C | 100 |
| Ex. 67 | 31x-101 | 0.0 | — | Himilan 1652 | 5.5 | 110 | 31x-101 | 0.0 | — | Nucrel N1050H | 500 | 110 | 160 | C | 80 |
| Ex. 68 | 31x-101 | 0.0 | — | Himilan 1702 | 16 | 110 | 31x-101 | 0.0 | — | Nucrel N1108C | 8.0 | 110 | 160 | C | 110 |

TABLE 6

| | First sealing portion | | | | | | Second sealing portion | | | | | | | | |
|---|---|---|---|---|---|---|---|---|---|---|---|---|---|---|---|
| | Outer resin sealing portion | | Melt. | Intermediate resin sealing portion | | Melt. | Outer resin sealing portion | | Melt. | Intermediate resin sealing portion | | Melt. | Seal- | | Charac- |
| | Resin | MFR (g/10 min) | temp. 1 (° C.) | Resin | MFR (g/10 min) | temp. 2 (° C.) | Resin | MFR (g/10 min) | temp. 3 (° C.) | Resin | MFR (g/10 min) | temp. 4 (° C.) | ing temp. (° C.) | Electro- lyte | teristics evalu- ation |
| Ex. 69 | 31x-101 | 0.0 | — | Nucrel N1050H | 500 | 110 | 31x-101 | 0.0 | — | Himilan 1702 | 16 | 110 | 160 | C | 105 |
| Ex. 70 | 31x-101 | 0.0 | — | Nucrel N1525 | 25 | 110 | 31x-101 | 0.0 | — | Himilan 1702 | 16 | 110 | 160 | C | 105 |
| Ex. 71 | 31x-101 | 0.0 | — | 05L04 | 8.0 | 120 | 31x-101 | 0.0 | — | Himilan 1652 | 5.5 | 110 | 160 | C | 95 |
| Ex. 72 | 31x-101 | 0.0 | — | 05L05 | 9.0 | 135 | 31x-101 | 0.0 | — | Nucrel N1108C | 8.0 | 110 | 160 | C | 110 |
| Ex. 73 | Himilan 1652 | 5.5 | 120 | — | — | — | Himilan 1652 | 5.5 | 120 | Nucrel N1108C | 8.0 | 110 | 160 | C | 70 |
| Ex. 74 | Himilan 1652 | 5.5 | 120 | — | — | — | Himilan 1652 | 5.5 | 120 | Himilan 1702 | 16 | 110 | 160 | C | 70 |
| Ex. 75 | Himilan 1652 | 5.5 | 120 | Nucrel N1050H | 500 | 110 | Himilan 1652 | 5.5 | 120 | — | — | — | 160 | C | 70 |
| Ex. 76 | Bynel 4164 | 1.2 | 160 | Nucrel N1108C | 8.0 | 110 | Bynel 4164 | 1.2 | 160 | — | — | — | 160 | C | 70 |
| Ex. 77 | Soarnol A4412 | ≤7 (12@210° C.) | 230 | Nucrel N1108C | 8.0 | 110 | Soarnol A4412 | ≤7 (12@210° C.) | 230 | Nucrel N1108C | 8.0 | 110 | 160 | C | 90 |
| Ex. 78 | Exceval RS2117 | ≤7 | 230 | Nucrel N1108C | 8.0 | 110 | Exceval RS2117 | ≤7 | 230 | Nucrel N1108C | 8.0 | 110 | 160 | C | 90 |
| Ex. 79 | Nucrel N1108C | 8.0 | 110 | Himilan 1652 | 5.5 | 120 | Nucrel N1108C | 8.0 | 110 | Himilan 1652 | 5.5 | 120 | 160 | A | 65 |
| Comp. Ex. 13 | Himilan 1652 | 5.5 | 120 | — | — | — | Himilan 1652 | 5.5 | 120 | — | — | — | 160 | C | 30 |
| Comp. Ex. 14 | Nucrel N1108C | 8.0 | 110 | — | — | — | Bynel 42E703 | 6.4 | 120 | — | — | — | 160 | C | 30 |
| Comp. Ex. 15 | Nucrel N1050H | 500 | 110 | — | — | — | Nucrel N1050H | 500 | 110 | — | — | — | 160 | C | 20 |
| Comp. Ex. 16 | Himilan 1652 | 5.5 | 120 | — | — | — | Bynel 4164 | 1.2 | 120 | — | — | — | 160 | C | 20 |
| Comp. Ex. 17 | Bynel 4164 | 1.2 | 160 | — | — | — | Bynel 4164 | 1.2 | 160 | — | — | — | 210 | C | 20 |
| Comp. Ex. 18 | 31x-101 | 0.0 | — | — | — | — | 31x-101 | 0.0 | — | — | — | — | — | C | 10 |

TABLE 7

| | First sealing portion | | | | | | Second sealing portion | | | | | | | | |
|---|---|---|---|---|---|---|---|---|---|---|---|---|---|---|---|
| | Outer resin sealing portion | | | Intermediate resin sealing portion | | | Outer resin sealing portion | | | Intermediate resin sealing portion | | | | | |
| | Resin | Melting point (° C.) | Melt. temp. 1 (° C.) | Resin | Melting point (° C.) | Melt temp. 2 (° C.) | Resin | Melting point (° C.) | Melt. temp. 3 (° C.) | Resin | Melting point (° C.) | Melt. temp. 4 (° C.) | Sealing temp. (° C.) | Electrolyte | Characteristics evaluation |
| Ex. 80 | Himilan 1652 | 98 | 120 | Nucrel N1108C | 97 | 110 | Himilan 1652 | 98 | 120 | Nucrel N1108C | 97 | 110 | 160 | A | 90 |
| Ex. 81 | Himilan 1652 | 98 | 120 | Himilan 1702 | 90 | 110 | Himilan 1652 | 98 | 120 | Himilan 1702 | 90 | 110 | 160 | A | 85 |
| Ex. 82 | Himilan 1652 | 98 | 120 | Nucrel N1050H | 95 | 110 | Himilan 1652 | 98 | 120 | Nucrel N1050H | 95 | 110 | 160 | A | 70 |
| Ex. 83 | Bynel 4164 | 127 | 160 | Nucrel N1108C | 97 | 110 | Bynel 4164 | 127 | 160 | Nucrel N1108C | 97 | 110 | 160 | A | 100 |
| Ex. 84 | Bynel 42E703 | 105 | 120 | Himilan 1702 | 90 | 130 | Bynel 42E703 | 105 | 120 | Himilan 1702 | 90 | 130 | 160 | A | 70 |
| Ex. 85 | Bynel 50E806 | 140 | 190 | Himilan 1702 | 90 | 110 | Bynel 50E806 | 140 | 190 | Himilan 1702 | 90 | 110 | 160 | A | 85 |
| Ex. 86 | Bynel 50E725 | 144 | 190 | Himilan 1652 | 98 | 110 | Bynel 50E725 | 144 | 190 | Himilan 1652 | 98 | 110 | 160 | A | 75 |
| Ex. 87 | Bynel 50E806 | 142 | 190 | Himilan 1652 | 98 | 110 | Bynel 50E806 | 142 | 190 | Himilan 1652 | 98 | 110 | 160 | A | 75 |
| EX. 88 | Bynel 4140 | 121 | 160 | Nucrel N1108C | 97 | 110 | Bynel 4140 | 121 | 160 | Nucrel N1108C | 97 | 110 | 160 | A | 90 |
| Ex. 89 | Bynel 41E710 | 115 | 160 | Nucrel N1525 | 93 | 110 | Bynel 41E710 | 115 | 160 | Nucrel N1108C | 97 | 110 | 160 | A | 90 |
| Ex. 90 | Bynel 41E871 | 121 | 160 | Nucrel N1108C | 97 | 110 | Bynel 41E871 | 121 | 160 | Himilan 1702 | 90 | 110 | 160 | A | 85 |
| Ex. 91 | Bynel 4125 | 126 | 160 | Himilan 1702 | 90 | 110 | Himilan 1652 | 98 | 120 | Himilan 1702 | 90 | 110 | 160 | A | 85 |
| Ex. 92 | Bynel 4157N | 127 | 160 | Himilan 1702 | 90 | 110 | Bynel 4164 | 127 | 160 | Himilan 1652 | 98 | 110 | 160 | A | 75 |
| Ex. 93 | Bynel 41E762 | 127 | 160 | Himilan 1652 | 98 | 110 | Bynel 42E703 | 105 | 120 | Nucrel N1108C | 97 | 110 | 210 | A | 90 |
| Ex. 94 | 31x-101 | Not melted at ≤200° C. | — | Himilan 1652 | 98 | 110 | 31x-101 | Not melted at ≤200° C. | — | Nucrel N1050H | 95 | 110 | 160 | A | 65 |
| Ex. 95 | 31x-101 | Not melted at ≤200° C. | — | Himilan 1702 | 90 | 110 | 31x-101 | Not melted at ≤200° C. | — | Nucrel N1108C | 97 | 110 | 160 | A | 85 |

TABLE 8

| | First sealing portion | | | | | | Second sealing portion | | | | | | | | |
|---|---|---|---|---|---|---|---|---|---|---|---|---|---|---|---|
| | Outer resin sealing portion | | | Intermediate resin sealing portion | | | Outer resin sealing portion | | | Intermediate resin sealing portion | | | | | |
| | Resin | Melting point (° C.) | Melt. temp. 1 (° C.) | Resin | Melting point (° C.) | Melt. temp. 2 (° C.) | Resin | Melting point (° C.) | Melt. temp. 3 (° C.) | Resin | Melting point (° C.) | Melt. temp. 4 (° C.) | Sealing temp. (° C.) | Electrolyte | Characteristics evaluation |
| Ex. 96 | 31x-101 | Not melted at ≤200° C. | — | Nucrel N1050H | 95 | 110 | 31x-101 | Not melted at ≤200° C. | — | Himilan 1702 | 90 | 110 | 160 | A | 80 |
| Ex. 97 | 31x-101 | Not melted at ≤200° C. | — | Nucrel N1525 | 93 | 110 | 31x-101 | Not melted at ≤200° C. | — | Himilan 1702 | 90 | 110 | 160 | A | 80 |
| Ex. 98 | 31x-101 | Not melted at ≤200° C. | — | 05L04 | 107 | 120 | 31x-101 | Not melted at ≤200° C. | — | Himilan 1652 | 98 | 110 | 160 | A | 70 |
| Ex. 99 | 31x-101 | Not melted at ≤200° C. | — | 05L05 | 122 | 135 | 31x-101 | Not melted at ≤200° C. | — | Nucrel N1108C | 97 | 110 | 160 | A | 85 |
| Ex. 100 | Himilan 1652 | 98 | 120 | — | — | — | Himilan 1652 | 98 | 120 | Nucrel N1108C | 97 | 110 | 160 | A | 75 |

TABLE 8-continued

| | First sealing portion | | | | | | Second sealing portion | | | | | | | | |
|---|---|---|---|---|---|---|---|---|---|---|---|---|---|---|---|
| | Outer resin sealing portion | | | Intermediate resin sealing portion | | | Outer resin sealing portion | | | Intermediate resin sealing portion | | | | | |
| | Resin | Melting point (° C.) | Melt. temp. 1 (° C.) | Resin | Melting point (° C.) | Melt. temp. 2 (° C.) | Resin | Melting point (° C.) | Melt. temp. 3 (° C.) | Resin | Melting point (° C.) | Melt. temp. 4 (° C.) | Sealing temp. (° C.) | Electrolyte | Characteristics evaluation |
| Ex. 101 | Himilan 1652 | 98 | 120 | — | — | — | Himilan 1652 | 98 | 120 | Himilan 1702 | 90 | 110 | 160 | A | 75 |
| Ex. 102 | Himilan 1652 | 98 | 120 | Nucrel N1050H | 95 | 110 | Himilan 1652 | 98 | 120 | — | — | — | 160 | A | 75 |
| Ex. 103 | Bynel 4164 | 127 | 160 | Nucrel N1108C | 97 | 110 | Bynel 4164 | 127 | 160 | — | — | — | 160 | A | 75 |
| Ex. 104 | Soarnol A4412 | 164 | 230 | Nucrel N1108C | 97 | 110 | Soarnol A4412 | 164 | 230 | Nucrel N1108C | 97 | 110 | 160 | A | 80 |
| Comp. Ex. 19 | Himilan 1652 | 98 | 120 | — | — | — | Himilan 1652 | 98 | 120 | — | — | — | 160 | A | 30 |
| Comp. Ex. 20 | Nucrel N1108C | 97 | 110 | — | — | — | Bynel 42E703 | 105 | 120 | — | — | — | 160 | A | 30 |
| Comp. Ex. 21 | Nucrel N1050H | 95 | 110 | — | — | — | Nucrel N1050H | 95 | 110 | — | — | — | 160 | A | 10 |
| Comp. Ex. 22 | Himilan 1652 | 98 | 120 | — | — | — | Bynel 4164 | 127 | 120 | — | — | — | 160 | A | 30 |
| Comp. Ex. 23 | Bynel 4164 | 127 | 160 | — | — | — | Bynel 4164 | 127 | 160 | — | — | — | 210 | A | 30 |
| Comp. Ex. 24 | 31x-101 | Not melted at ≤200° C. | — | — | — | — | 31x-101 | Not melted at ≤200° C. | — | — | — | — | — | A | 20 |

TABLE 9

| | First sealing portion | | | | | | Second sealing portion | | | | | | | | |
|---|---|---|---|---|---|---|---|---|---|---|---|---|---|---|---|
| | Outer resin sealing portion | | | Intermediate resin sealing portion | | | Outer resin sealing portion | | | Intermediate resin sealing portion | | | | | |
| | Resin | Melting point (° C.) | Melt. temp. 1 (° C.) | Resin | Melting point (° C.) | Melt temp. 2 (° C.) | Resin | Melting point (° C.) | Melt. temp. 3 (° C.) | Resin | Melting point (° C.) | Melt. temp. 4 (° C.) | Sealing temp. (° C.) | Electrolyte | Characteristics evaluation |
| Ex. 105 | Himilan 1652 | 98 | 120 | Nucrel N1108C | 97 | 110 | Himilan 1652 | 98 | 120 | Nucrel N1108C | 97 | 110 | 160 | B | 110 |
| Ex. 106 | Himilan 1652 | 98 | 120 | Himilan 1702 | 90 | 110 | Himilan 1652 | 98 | 120 | Himilan 1702 | 90 | 110 | 160 | B | 105 |
| Ex. 107 | Himilan 1652 | 98 | 120 | Nucrel N1050H | 95 | 110 | Himilan 1652 | 98 | 120 | Nucrel N1050H | 95 | 110 | 160 | B | 90 |
| Ex. 108 | Bynel 4164 | 127 | 160 | Nucrel N1108C | 97 | 110 | Bynel 4164 | 127 | 160 | Nucrel N1108C | 97 | 110 | 160 | B | 110 |
| Ex. 109 | Bynel 42E703 | 105 | 120 | Himilan 1702 | 90 | 130 | Bynel 42E703 | 105 | 120 | Himilan 1702 | 90 | 130 | 160 | B | 90 |
| Ex. 110 | Bynel 50E806 | 140 | 190 | Himilan 1702 | 90 | 110 | Bynel 50E806 | 140 | 190 | Himilan 1702 | 90 | 110 | 160 | B | 105 |
| Ex. 111 | Bynel 50E725 | 144 | 190 | Himilan 1652 | 98 | 110 | Bynel 50E725 | 144 | 190 | Himilan 1652 | 98 | 110 | 160 | B | 95 |
| Ex. 112 | Bynel 50E806 | 142 | 190 | Himilan 1652 | 98 | 110 | Bynel 50E806 | 142 | 190 | Himilan 1652 | 98 | 110 | 160 | B | 95 |
| Ex. 113 | Bynel 4140 | 121 | 160 | Nucrel N1108C | 97 | 110 | Bynel 4140 | 121 | 160 | Nucrel N1108C | 97 | 110 | 160 | B | 110 |
| Ex. 114 | Bynel 41E710 | 115 | 160 | Nucrel N1525 | 93 | 110 | Bynel 41E710 | 115 | 160 | Nucrel N1108C | 97 | 110 | 160 | B | 110 |
| Ex. 115 | Bynel 41E871 | 121 | 160 | Nucrel N1108C | 97 | 110 | Bynel 41E871 | 121 | 160 | Himilan 1702 | 90 | 110 | 160 | B | 105 |
| Ex. 116 | Bynel 4125 | 126 | 160 | Himilan 1702 | 90 | 110 | Himilan 1652 | 98 | 120 | Himilan 1702 | 90 | 110 | 160 | B | 105 |
| Ex. 117 | Bynel 4157H | 127 | 160 | Himilan 1702 | 90 | 110 | Bynel 4164 | 127 | 160 | Himilan 1652 | 98 | 110 | 160 | B | 95 |
| Ex. 118 | Bynel 41E762 | 127 | 160 | Himilan 1652 | 98 | 110 | Bynel 42E703 | 105 | 120 | Nucrel N1108C | 97 | 110 | 210 | B | 110 |

TABLE 9-continued

| | First sealing portion | | | | | | Second sealing portion | | | | | | | | |
|---|---|---|---|---|---|---|---|---|---|---|---|---|---|---|---|
| | Outer resin sealing portion | | | Intermediate resin sealing portion | | | Outer resin sealing portion | | | Intermediate resin sealing portion | | | | | |
| | Resin | Melting point (° C.) | Melt. temp. 1 (° C.) | Resin | Melting point (° C.) | Melt temp. 2 (° C.) | Resin | Melting point (° C.) | Melt. temp. 3 (° C.) | Resin | Melting point (° C.) | Melt. temp. 4 (° C.) | Sealing temp. (° C.) | Electrolyte | Characteristics evaluation |
| Ex. 119 | 31x-101 | Not melted at ≤200° C. | — | Himilan 1652 | 98 | 110 | 31x-101 | Not melted at ≤200° C. | — | Nucrel N1050H | 95 | 110 | 160 | B | 90 |
| Ex. 120 | 31x-101 | Not melted at ≤200° C. | — | Himilan 1702 | 90 | 110 | 31x-101 | Not melted at ≤200° C. | — | Nucrel N1108C | 97 | 110 | 160 | B | 110 |

TABLE 10

| | First sealing portion | | | | | | Second sealing portion | | | | | | | | |
|---|---|---|---|---|---|---|---|---|---|---|---|---|---|---|---|
| | Outer resin sealing portion | | | Intermediate resin sealing portion | | | Outer resin sealing portion | | | Intermediate resin sealing portion | | | | | |
| | Resin | Melting point (° C.) | Melt. temp. 1 (° C.) | Resin | Melting point (° C.) | Melt. temp. 2 (° C.) | Resin | Melting point (° C.) | Melt. temp. 3 (° C.) | Resin | Melting point (° C.) | Melt. temp. 4 (° C.) | Sealing temp. (° C.) | Electrolyte | Characteristics evaluation |
| Ex. 121 | 31x-101 | Not melted at ≤200° C. | — | Nucrel N1050H | 95 | 110 | 31x-101 | Not melted at ≤200° C. | — | Himilan 1702 | 90 | 110 | 160 | B | 105 |
| Ex. 122 | 31x-101 | Not melted at ≤200° C. | — | Nucrel N1525 | 93 | 110 | 31x-101 | Not melted at ≤200° C. | — | Himilan 1702 | 90 | 110 | 160 | B | 105 |
| Ex. 123 | 31x-101 | Mot melted at ≤200° C. | — | 05L04 | 107 | 120 | 31x-101 | Not melted at ≤200° C. | — | Himilan 1652 | 98 | 110 | 160 | B | 95 |
| Ex. 124 | 31x-101 | Not melted at ≤200° C. | — | 05L05 | 122 | 135 | 31x-101 | Not melted at ≤200° C. | — | Nucrel N1108C | 97 | 110 | 160 | B | 110 |
| Ex. 125 | Himilan 1652 | 98 | 120 | — | — | — | Himilan 1652 | 98 | 120 | Nucrel N1108C | 97 | 110 | 160 | B | 85 |
| Ex. 126 | Himilan 1652 | 98 | 120 | — | — | — | Himilan 1652 | 98 | 120 | Himilan 1702 | 90 | 110 | 160 | B | 85 |
| Ex. 127 | Himilan 1652 | 98 | 120 | Nucrel N1050H | 95 | 110 | Himilan 1652 | 98 | 120 | — | — | — | 160 | B | 85 |
| Ex. 128 | Bynel 4164 | 127 | 160 | Nucrel N1108C | 97 | 110 | Bynel 4164 | 127 | 160 | — | — | — | 160 | B | 85 |
| Ex. 129 | Soarnol A4412 | 164 | 230 | Nucrel N1108C | 97 | 110 | Soarnol A4412 | 164 | 230 | Nucrel N1108C | 97 | 110 | 160 | B | 90 |
| Comp. Ex. 25 | Himilan 1652 | 98 | 120 | — | — | — | Himilan 1652 | 98 | 120 | — | — | — | 160 | B | 40 |
| Comp. Ex. 26 | Nucrel N1108C | 97 | 110 | — | — | — | Bynel 42E703 | 105 | 120 | — | — | — | 160 | B | 40 |
| Comp. Ex. 27 | Nucrel N1050H | 95 | 110 | — | — | — | Nucrel N1050H | 95 | 110 | — | — | — | 160 | B | 20 |
| Comp. Ex. 28 | Himilan 1652 | 98 | 120 | — | — | — | Bynel 4164 | 127 | 120 | — | — | — | 160 | B | 40 |
| Comp. Ex. 29 | Bynel 4164 | 127 | 160 | — | — | — | Bynel 4164 | 127 | 160 | — | — | — | 210 | B | 40 |
| Comp. Ex. 30 | 31x-101 | Not melted at ≤200° C. | — | — | — | — | 31x-101 | Not melted at ≤200° C. | — | — | — | — | — | B | 30 |

TABLE 11

| | First sealing portion | | | | | | Second sealing portion | | | | | | | | |
|---|---|---|---|---|---|---|---|---|---|---|---|---|---|---|---|
| | Outer resin sealing portion | | | Intermediate resin sealing portion | | | Outer resin sealing portion | | | Intermediate resin sealing portion | | | | | |
| | Resin | Melting point (° C.) | Melt. temp. 1 (° C.) | Resin | Melting point (° C.) | Melt temp. 2 (° C.) | Resin | Melting point (° C.) | Melt. temp. 3 (° C.) | Resin | Melting point (° C.) | Melt. temp. 4 (° C.) | Sealing temp. (° C.) | Electrolyte | Characteristics evaluation |
| Ex. 130 | Himilan 1652 | 98 | 120 | Nucrel N1108C | 97 | 110 | Himilan 1652 | 98 | 120 | Nucrel N1108C | 97 | 110 | 160 | C | 110 |
| Ex. 131 | Himilan 1652 | 98 | 120 | Himilan 1702 | 90 | 110 | Himilan 1652 | 98 | 120 | Himilan 1702 | 90 | 110 | 160 | C | 105 |
| Ex. 132 | Himilan 1652 | 98 | 120 | Nucrel N1050H | 95 | 110 | Himilan 1652 | 98 | 120 | Nucrel N1050H | 95 | 110 | 160 | C | 95 |
| Ex. 133 | Bynel 4164 | 127 | 160 | Nucrel N1108C | 97 | 110 | Bynel 4164 | 127 | 160 | Nucrel N1108C | 97 | 110 | 160 | C | 110 |
| Ex. 134 | Bynel 42E703 | 105 | 120 | Himilan 1702 | 90 | 130 | Bynel 42E703 | 105 | 120 | Himilan 1702 | 90 | 130 | 160 | C | 85 |
| Ex. 135 | Bynel 50E806 | 140 | 190 | Himilan 1702 | 90 | 110 | Bynel 50E806 | 140 | 190 | Himilan 1702 | 90 | 110 | 160 | C | 105 |
| Ex. 136 | Bynel 50E725 | 144 | 190 | Himilan 1652 | 98 | 110 | Bynel 50E725 | 144 | 190 | Himilan 1652 | 98 | 110 | 160 | C | 85 |
| Ex. 137 | Bynel 50E806 | 142 | 190 | Himilan 1652 | 98 | 110 | Bynel 50E806 | 142 | 190 | Himilan 1652 | 98 | 110 | 160 | C | 85 |
| EX. 138 | Bynel 4140 | 121 | 160 | Nucrel N1108C | 97 | 110 | Bynel 4140 | 121 | 160 | Nucrel N1108C | 97 | 110 | 160 | C | 110 |
| Ex. 139 | Bynel 41E710 | 115 | 160 | Nucrel N1525 | 93 | 110 | Bynel 41E710 | 115 | 160 | Nucrel N1108C | 97 | 110 | 160 | C | 110 |
| Ex. 140 | Bynel 41E871 | 121 | 160 | Nucrel N1108C | 97 | 110 | Bynel 41E871 | 121 | 160 | Himilan 1702 | 90 | 110 | 160 | C | 105 |
| Ex. 141 | Bynel 4125 | 126 | 160 | Himilan 1702 | 90 | 110 | Himilan 1652 | 98 | 120 | Himilan 1702 | 90 | 110 | 160 | C | 105 |
| Ex. 142 | Bynel 4157N | 127 | 160 | Himilan 1702 | 90 | 110 | Bynel 4164 | 127 | 160 | Himilan 1652 | 98 | 110 | 160 | C | 100 |
| Ex. 143 | Bynel 41E762 | 127 | 160 | Himilan 1652 | 98 | 110 | Bynel 42E703 | 105 | 120 | Nucrel N1108C | 97 | 110 | 210 | C | 100 |
| Ex. 144 | 31x-101 | Not melted at ≤200° C. | — | Himilan 1652 | 98 | 110 | 31x-101 | Not melted at ≤200° C. | — | Nucrel N1050H | 95 | 110 | 160 | C | 80 |
| Ex. 145 | 31x-101 | Not melted at ≤200° C. | — | Himilan 1702 | 90 | 110 | 31x-101 | Not melted at ≤200° C. | — | Nucrel N1108C | 97 | 110 | 160 | C | 110 |

TABLE 12

| | First sealing portion | | | | | | Second sealing portion | | | | | | | | |
|---|---|---|---|---|---|---|---|---|---|---|---|---|---|---|---|
| | Outer resin sealing portion | | | Intermediate resin sealing portion | | | Outer resin sealing portion | | | Intermediate resin sealing portion | | | | | |
| | Resin | Melting point (° C.) | Melt. temp. 1 (° C.) | Resin | Melting point (° C.) | Melt. temp. 2 (° C.) | Resin | Melting point (° C.) | Melt. temp. 3 (° C.) | Resin | Melting point (° C.) | Melt. temp. 4 (° C.) | Sealing temp. (° C.) | Electrolyte | Characteristics evaluation |
| Ex. 146 | 31x-101 | Not melted at ≤200° C. | — | Nucrel N11050H | 95 | 110 | 31x-101 | Not melted at ≤200° C. | — | Himilan 1702 | 90 | 110 | 160 | C | 105 |
| Ex. 147 | 31x-101 | Not melted at ≤200° C. | — | Nucrel N1525 | 93 | 110 | 31x-101 | Not melted at ≤200° C. | — | Himilan 1702 | 90 | 110 | 160 | C | 105 |
| Ex. 148 | 31x-101 | Not melted at ≤200° C. | — | 05L04 | 107 | 120 | 31x-101 | Not melted at ≤200° C. | — | Himilan 1652 | 98 | 110 | 160 | C | 95 |
| Ex. 149 | 31x-101 | Not melted at ≤200° C. | — | 05L05 | 122 | 135 | 31x-101 | Not melted at ≤200° C. | — | Nucrel N1108C | 97 | 110 | 160 | C | 110 |

TABLE 12-continued

| | First sealing portion | | | | | | Second sealing portion | | | | | | | | |
|---|---|---|---|---|---|---|---|---|---|---|---|---|---|---|---|
| | Outer resin sealing portion | | | Intermediate resin sealing portion | | | Outer resin sealing portion | | | Intermediate resin sealing portion | | | | | |
| | Resin | Melting point (° C.) | Melt. temp. 1 (° C.) | Resin | Melting point (° C.) | Melt. temp. 2 (° C.) | Resin | Melting point (° C.) | Melt. temp. 3 (° C.) | Resin | Melting point (° C.) | Melt. temp. 4 (° C.) | Sealing temp. (° C.) | Electrolyte | Characteristics evaluation |
| Ex. 150 | Himilan 1652 | 98 | 120 | — | — | — | Himilan 1652 | 98 | 120 | Nucrel N1108C | 97 | 110 | 160 | C | 70 |
| Ex. 151 | Himilan 1652 | 98 | 120 | — | — | — | Himilan 1652 | 98 | 120 | Himilan 1702 | 90 | 110 | 160 | C | 70 |
| Ex. 152 | Himilan 1652 | 98 | 120 | Nucrel N1050H | 95 | 110 | Himilan 1652 | 98 | 120 | — | — | — | 160 | C | 70 |
| Ex. 153 | Bynel 4164 | 127 | 160 | Nucrel N1108C | 97 | 110 | Bynel 4164 | 127 | 160 | — | — | — | 160 | C | 70 |
| Ex. 154 | Soarnol A4412 | 164 | 230 | Nucrel N1108C | 97 | 110 | Soarnol A4412 | 164 | 230 | Nucrel N1108C | 97 | 110 | 160 | C | 90 |
| Ex. 155 | Nucrel N1108C | 97 | 110 | Himilan 1652 | 98 | 120 | Nucrel N1108C | 97 | 110 | Himilan 1652 | 98 | 120 | 160 | A | 65 |
| Comp. Ex. 31 | Himilan 1652 | 98 | 120 | — | — | — | Himilan 1652 | 98 | 120 | — | — | — | 160 | C | 30 |
| Comp. Ex. 32 | Nucrel N1108C | 97 | 110 | — | — | — | Bynel 42E703 | 105 | 120 | — | — | — | 160 | C | 30 |
| Comp. Ex. 33 | Nucrel N1050H | 95 | 110 | — | — | — | Nucrel N1050H | 95 | 110 | — | — | — | 160 | C | 20 |
| Comp. Ex. 34 | Himilan 1652 | 98 | 120 | — | — | — | Bynel 4164 | 127 | 120 | — | — | — | 160 | C | 20 |
| Comp. Ex. 35 | Bynel 4164 | 127 | 160 | — | — | — | Bynel 4164 | 127 | 160 | — | — | — | 210 | C | 20 |
| Comp. Ex. 36 | 31x-101 | Not melted at ≤200° C. | — | — | — | — | 31x-101 | Not melted at ≤200° C. | — | — | — | — | — | C | 10 |

According to the results of Tables 1 to 6, it was found that the dye-sensitized solar cells of Examples 1 to 79 demonstrated superior durability in comparison with the dye-sensitized solar cells of Comparative Examples 1 to 18 regardless of the type of electrolyte.

In addition, according to the results of Tables 7 to 12, it was found that the dye-sensitized solar cells of Examples 80 to 155 demonstrated superior durability in comparison with the dye-sensitized solar cells of Comparative Examples 19 to 36 regardless of the type of electrolyte.

Accordingly, according to the electronic device of the present invention, durability was confirmed to be able to be adequately maintained even in the case of being placed in an environment subjected to large changes in temperature.

EXPLANATION OF REFERENCE NUMERALS

1, 101 Working electrode (first substrate)
2 Counter electrode (second substrate)
3 Electrolyte layer (sealed portion)
4A First sealing portion
4B Second sealing portion
4 Sealing portion
7 Transparent electrically conductive film (electrically conductive film)
8 Porous oxide semiconductor layer
9 Counter electrode substrate
10 Catalyst film
13A, 13B Protruding portion
100, 200 Dye-sensitized solar cell
201 Covering portion
202 Boundary between sealing portion and counter electrode
203 Boundary between sealing portion and working electrode
204 Boundary between intermediate resin sealing portion and outer resin sealing portion
C1 First annular site
C2 Second annular site

The invention claimed is:

1. An electronic device comprising:

a first substrate;

a second substrate arranged opposite the first substrate;

a sealed portion arranged between the first substrate and the second substrate; and a sealing portion that connects the first substrate and the second substrate and is provided around the sealed portion, wherein at least a portion of the sealing portion following along the periphery of the sealed portion has:

outer resin sealing portions respectively fixed to the first substrate and the second substrate and, an intermediate resin sealing portion arranged so as to be interposed by the outer resin sealing portions between the first substrate and the second substrate, both the outer resin sealing portions and the intermediate resin sealing portion contain a resin, the resin being an acid-modified polyethylene, a melt flow rate of the intermediate resin sealing portion is larger than a melt flow rate of the outer resin sealing portions, and the difference between the melt flow rate of the intermediate resin sealing portion and the melt flow rate of the outer resin sealing portions is 1 g/10 min or more, the first substrate includes a porous oxide semiconductor layer, an electrically conductive film having a surface, and a protruding portion, the porous oxide semiconductor layer is formed on the surface of the electrically conductive film, the protruding portion is formed on the surface of the electrically conductive film and protrudes on the surface of the electrically conductive film, the protruding portion is arranged between the outer resin sealing portion and the electrically conductive film, the protruding portion is composed of an inorganic insulating material, the inorganic insulating material consisting of a glass frit, the protruding portion is in direct contact with the outer sealing portion and is interposed between the outer sealing portion fixed to the first substrate and the electrically conductive film, and the sealed portion is an electrolyte.

2. The electronic device according to claim 1, further comprising a covering portion on the opposite side of the sealed portion to the sealing portion, the covering portion at least covering a boundary between the first substrate and the sealing portion, a boundary between the second substrate and the sealing portion, and the boundaries between the intermediate resin sealing portion and the outer resin sealing portions, and the covering portion containing the second resin.

3. The electronic device according to claim 1, wherein the difference between the melt flow rate of the intermediate resin sealing portion and the melt flow rate of the outer resin sealing portions is from 2.5 g/10 min to 25 g/10 min.

* * * * *